United States Patent
Kaku et al.

(10) Patent No.: US 7,084,855 B2
(45) Date of Patent: Aug. 1, 2006

(54) IMAGE GENERATION METHOD, PROGRAM, AND INFORMATION STORAGE MEDIUM

(75) Inventors: Ryoichi Kaku, Yokohama (JP); Norihiro Nishimura, Tokyo-to (JP)

(73) Assignee: Namco Bandai Games, Inc., Tokyo (JP)

( * ) Notice: Subject to any disclaimer, the term of this patent is extended or adjusted under 35 U.S.C. 154(b) by 249 days.

(21) Appl. No.: 10/232,379

(22) Filed: Sep. 3, 2002

(65) Prior Publication Data

US 2003/0063115 A1    Apr. 3, 2003

(30) Foreign Application Priority Data

Sep. 10, 2001   (JP) ............................. 2001-273537

(51) Int. Cl.
*G09G 5/00* (2006.01)
(52) U.S. Cl. ...................................... 345/158; 715/711
(58) Field of Classification Search ........ 345/156–159, 345/162
See application file for complete search history.

(56) References Cited

U.S. PATENT DOCUMENTS

| | | | | |
|---|---|---|---|---|
| 4,812,833 A | * | 3/1989 | Shimauchi | 345/175 |
| 5,495,576 A | * | 2/1996 | Ritchey | 345/420 |
| 6,002,739 A | * | 12/1999 | Heumann | 378/8 |
| 6,335,977 B1 | * | 1/2002 | Kage | 382/107 |
| 6,501,515 B1 | * | 12/2002 | Iwamura | 345/158 |
| 2003/0085871 A1 | * | 5/2003 | Ogawa | 345/158 |
| 2004/0178995 A1 | * | 9/2004 | Sterling | 345/173 |
| 2005/0088409 A1 | * | 4/2005 | Van Berkel | 345/157 |

* cited by examiner

*Primary Examiner*—Amare Mengistu
(74) *Attorney, Agent, or Firm*—Oliff & Berridge, PLC

(57) ABSTRACT

A detection device detects positions at which a sword-shaped controller traverses first and second sensor planes, which are formed by first and second sensors, respectively, and positions of which are associated in a one-to-one manner to positions on a screen. A position on the screen, an amount of change in the position per unit time, an absolute value of the amount of change of the position, and an orientation of the sword-shaped controller with respect to the screen are obtained from input information from the detection device. At least one of a special-effect image, a sound effect, and a parameter that causes a change in the special-effect image is changed, based on one of the obtained position, amount of change in the position per unit time, absolute value of the amount of change in the position, and the orientation of the sword-shaped controller, so that a special effect is changed with respect to the operator of the sword-shaped controller.

46 Claims, 18 Drawing Sheets

(SPEED OF SWING IS SLOW)

(SPEED OF SWING IS FAST)

FIG. 15

| | |
|---|---|
| SPECIAL TECHNIQUE 1 | POSITION 1, ORIENTATION 1, SPEED 1, SWING WIDTH 1<br>POSITION 2, ORIENTATION 2, SPEED 2, SWING WIDTH 2<br>⋮ |
| SPECIAL TECHNIQUE 2 | POSITION N, ORIENTATION N, SPEED N, SWING WIDTH N<br>⋮ |
| ⋮ | ⋮ |

IMAGE GENERATION METHOD, PROGRAM, AND INFORMATION STORAGE MEDIUM

Japanese Patent Application No. 2001-273537, filed on Sep. 10, 2001, is hereby incorporated by reference in its entirety.

BACKGROUND

The present invention relates to an image generation method, a program, and an information storage medium.

An image generation device (game system) that is known in the art generates an image as seen from a virtual camera (a given viewpoint) in an object space that is a virtual three-dimensional space, making it highly popular for enabling players to experience a virtual reality. Taking an image generation system that enables players to enjoy a gun-fighting game, by way of example, the player uses a handgun-shaped controller (shooting device) that is shaped in the form of a gun to shoot at target objects such as enemy characters (objects) that appear on a screen, thus enjoying a three-dimensional game that enables repeated fighting with enemy characters.

The controller is not limited to a handgun-shaped controller; it is also possible to conceive of a three-dimensional game in which the player uses a weapon such as a sword or saber as a manipulation input section to exchange blows with an enemy character on the screen. In such a case, it is necessary to have an input interface (input device and detection device) for inputting realistic slashing motions with respect to the enemy character on the screen, in order to increase the feeling of a virtual reality to the player. This input interface has to detect factors such as the position and orientation of the sword wielded by the player.

One method that could be considered for implementing such an input interface is to provide sensors in various parts of the sword-shaped controller and determine the position and orientation of the sword as the manipulation situation of the player from detection information from the sensors, by way of example.

However, this method could have disadvantages that adversely affect the reality in that the controller that is manipulated by the player as the input interface is expensive and heavy. In addition, there is the problem of bad detection accuracy. It is also necessary to provide wiring for supplying the detection information to the system side, which impairs operability and this could reduce the fun and interest of battling with the enemy character.

SUMMARY

One aspect of the present invention relates to an image generation method for generating an image, the method comprising:

obtaining at least one of a position on a screen of a display section and a change of the position on the screen, based on input information from a detection device which detects an object to be detected traversing a sensor plane, each position of the sensor plane corresponding to the position on the screen;

changing at least one of an image, a sound, and a given parameter, based on the obtained position on the screen or change of the position on the screen.

Another aspect of the present invention relates to an image generation method for generating an image, the method comprising:

obtaining at least one of a position on a screen of a display section and an amount of change per unit time of the position on the screen, based on input information from a detection device which detects an object to be detected traversing a sensor plane, each position of the sensor plane corresponding to the position on the screen; and changing at least one of an image, a sound, and a given parameter, based on the obtained position on the screen or amount of change per unit time of the position on the screen.

A further aspect of the present invention relates to an image generation method for generating an image, the method comprising:

obtaining at least one of a position on a screen of a display section, an amount of change per unit time of the position on the screen, and an absolute value of the amount of change in the position on the screen, based on input information from a detection device which detects an object to be detected traversing a sensor plane, each position of the sensor plane corresponding to the position on the screen; and changing at least one of an image, a sound, and a given parameter, based on the obtained position on the screen, amount of change per unit time of the position on the screen, and absolute value of the amount of change in the position on the screen.

A still further aspect of the present invention relates to an image generation method for generating an image, the method comprising:

obtaining at least one of a position on a screen of a display section, an amount of change per unit time of the position on the screen, an absolute value of the amount of change in the position on the screen, and an orientation of an object to be detected with respect to a direction toward a screen, based on input information from a detection device which detects an object to be detected traversing a sensor plane, each position of the sensor plane corresponding to the position on the screen; and changing at least one of an image, a sound, and a given parameter, based on the obtained position on the screen, amount of change per unit time of the position on the screen, absolute value of the amount of change in the position on the screen, and orientation of the object to be detected with respect to the direction toward the screen.

BRIEF DESCRIPTION OF THE SEVERAL VIEWS OF THE DRAWING

FIG. 15 is an illustrative view of an example of a table in which is previously recorded positions on the screen and resultant change patterns in response to special techniques.

DETAILED DESCRIPTION OF THE EMBODIMENT

Figure 1:
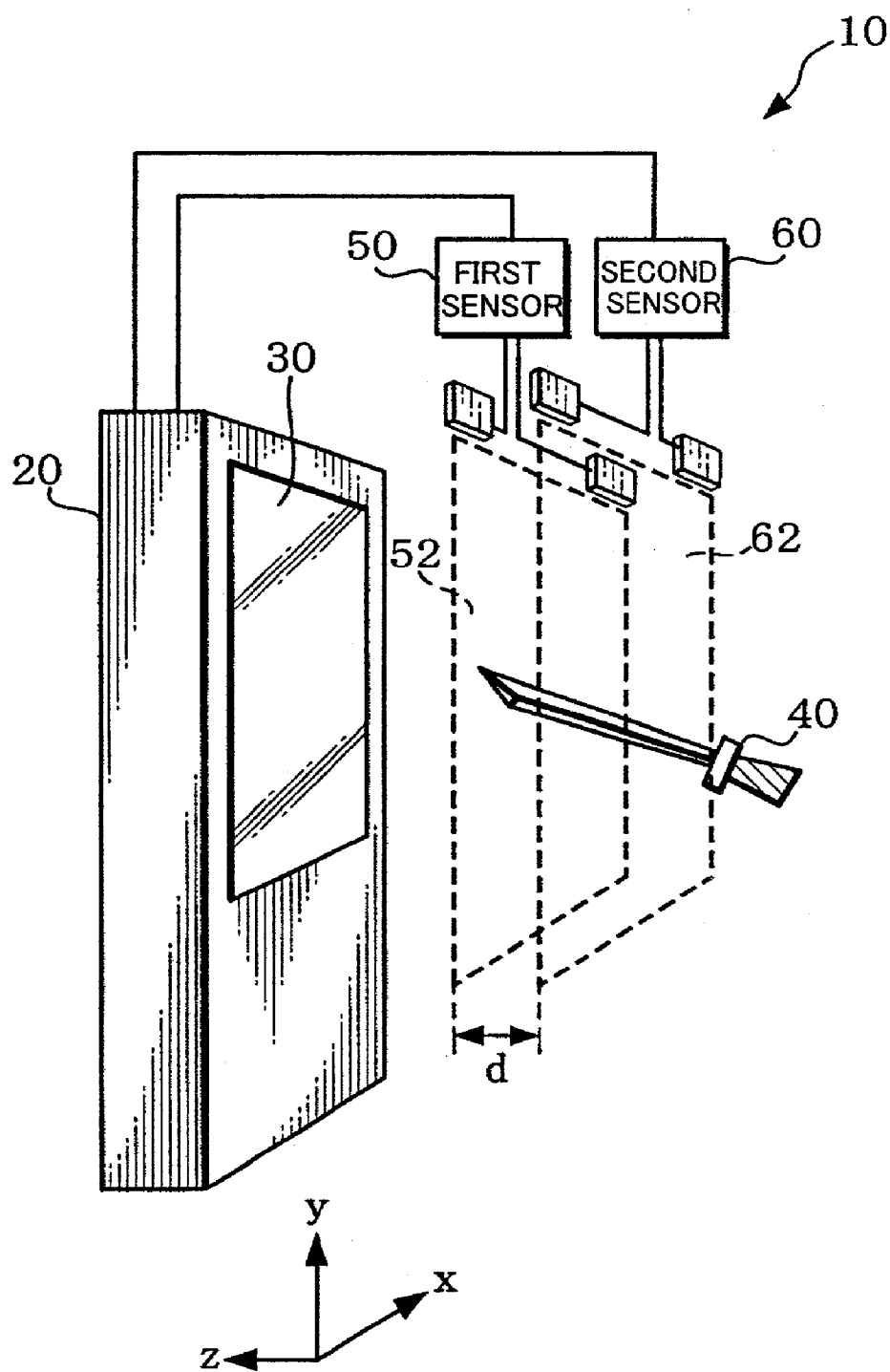
FIG. 1 is a schematic external perspective view of an image generation system in accordance with this embodiment when applied to an arcade game system.

Embodiments of the present invention are described below.

It should be noted that the embodiments described below do not in any way limit the scope of the present invention as laid out in the claims herein. In addition, the entirety of the configuration described with reference to the embodiments should not be taken as essential structural components of the present invention.

One embodiment of the present invention relates to an image generation method for generating an image, the method comprising:

obtaining at least one of a position on a screen of a display section and a change of the position on the screen, based on input information from a detection device which detects an object to be detected traversing a sensor plane, each position of the sensor plane corresponding to the position on the screen; and changing at least one of an image, a sound, and a given parameter, based on the obtained position on the screen or change of the position on the screen.

The embodiment in this case does not place any limitation on the principle of detection of the detection device, and the input information from the detection device that detected the object to be detected is also not limited in any way.

The given parameter is a parameter for causing a change in an image or a sound, such as a parameter that is associated with a character displayed on the screen (attacking power, defending power, or physical strength).

In this embodiment, the configuration is such that a position on the screen of the display section or a change of the position on the screen is obtained, based on input information from a detection device which detects an object to be detected that traverses a sensor plane, each position of which corresponds to the position on the screen. It is therefore possible for the operator to input manipulations by wide variety of operations (movements) of the object to be detected, which has not been possible up to now. This makes it possible to present special effects that reflect a wide variety of manipulation inputs from the operator, by causing a change in an image or a sound, or a parameter that causes a change in an image or a sound, in answer to the various manipulation inputs from the operator for example, thus enabling improvements in the feeling of a virtual reality that are not possible in the prior art.

Another embodiment of the present invention relates to an image generation method for generating an image, the method comprising:

obtaining at least one of a position on a screen of a display section and an amount of change per unit time of the position on the screen, based on input information from a detection device which detects an object to be detected traversing a sensor plane, each position of the sensor plane corresponding to the position on the screen; and changing at least one of an image, a sound, and a given parameter, based on the obtained position on the screen or amount of change per unit time of the position on the screen.

In this embodiment, the configuration is such that a position on the screen of the display section and the amount of change per unit time of the position on the screen are obtained, based on input information from a detection device which detects an object to be detected that traverses a sensor plane, each position of which corresponds to the position on the screen. It is therefore possible for the operator to input manipulations by wide variety of operations (movements) of the object to be detected, which has not been possible up to now, enabling the presentation of special effects that are not possible in the prior art, by changing an image, a sound, or a parameter that causes a change in an image or sound in accordance with the speed of the manipulation input, by way of example, thus increasing the feeling of a virtual reality even further.

Yet another embodiment of the present invention relates to an image generation method for generating an image, the method comprising:

obtaining at least one of a position on a screen of a display section, an amount of change per unit time of the position on the screen, and an absolute value of the amount of change in the position on the screen, based on input information from a detection device which detects an object to be detected traversing a sensor plane, each position of the sensor plane corresponding to the position on the screen; and changing at least one of an image, a sound, and a given parameter, based on the obtained position on the screen, amount of change per unit time of the position on the screen, and absolute value of the amount of change in the position on the screen.

In this embodiment, the configuration is such that a position on the screen of the display section, the amount of change per unit time of the position on the screen, and the absolute value of the amount of change in a position on the screen are obtained, based on input information from a detection device which detects an object to be detected that traverses a sensor plane, each position of which corresponds to the position on the screen. It is therefore possible for the operator to input manipulations by wide variety of operations (movements) of the object to be detected, which has not been possible up to now, enabling the presentation of special effects that are not possible in the prior art, by changing an image, a sound, or a parameter that causes a change in an image or sound in accordance with the speed of the manipulation input or distance of movement at a position specified by the manipulation input, by way of example, thus increasing the feeling of a virtual reality even further.

A further embodiment of the present invention relates to an image generation method for generating an image, the method comprising:

obtaining at least one of a position on a screen of a display section, an amount of change per unit time of the position on the screen, an absolute value of the amount of change in the position on the screen, and an orientation of an object to be detected with respect to a direction toward a screen, based on input information from a detection device which detects an object to be detected traversing a sensor plane, each position of the sensor plane corresponding to the position on the screen; and changing at least one of an image, a sound, and a given parameter, based on the obtained position on the screen, amount of change per unit time of the position on the screen, absolute value of the amount of change in the position on the screen, and orientation of the object to be detected with respect to the direction toward the screen.

In this embodiment, the configuration is such that a position on the screen of the display section, the amount of change per unit time of the position on the screen, the absolute value of the amount of change in a position on the screen, and the orientation of the object to be detected with respect to the direction towards the screen within the area are obtained, based on input information from a detection device which detects an object to be detected that traverses a sensor plane, each position of which corresponds to the position on the screen. It is therefore possible for the operator to input manipulations by wide variety of operations (movements) of the object to be detected, which has not been possible up to now, enabling the presentation of special effects that are not possible in the prior art, by changing an image, a sound, or a parameter that causes a change in an image or sound in accordance with the speed at a position specified by the manipulation input, the distance of movement at a position specified by the manipulation input, or the direction in which the operator has placed an object to be detected with respect to the screen, by way of example, thus increasing the feeling of a virtual reality even further.

In one of the above described embodiments, at least one of the image, sound, and given parameter may be changed, when the amount of change per unit time of the position on the screen is at least a given threshold.

Since the embodiments make it possible to prevent any repercussion of an unintentional manipulation input when the operator has tried to cause a change in an image in accordance with the speed at a position specified by the manipulation input, it is possible to avoid any deterioration of the feeling of a virtual reality obtained by the above described wide variety of manipulation inputs.

In one of the above described embodiments, at least one of the image, sound, and given parameter may be changed, when the absolute value of the amount of change of the position on the screen is at least a given threshold.

Since the embodiments make it possible to prevent any repercussion of an unintentional manipulation input when the operator has tried to cause a change in an image in accordance with the distance of movement at a position specified by the manipulation input, it is possible to avoid any deterioration of the feeling of a virtual reality obtained by the above-described wide variety of manipulation inputs.

In one of the above described embodiments, the detection device may comprise two pairs of sensors which form first and second sensor planes, respectively, the first and second sensor planes being disposed parally with a given distance, positions at which the object to be detected traverses the first and second sensor planes may be specified by the detection device, and the orientation of the object to be detected with respect to the direction towards the screen may be obtained based on first and second positions at which the object to be detected traverses the first and second sensor planes, respectively.

Since this embodiment makes it unnecessary to provide the manipulation input section with detection sensors or the like for specifying a position on the screen, it is possible to reduce the cost of components of the manipulation input section and this also makes it possible to enable any object to traverse the sensor planes as the manipulation input section, such as parts of the player's body (for example, the fists, feet, and head of the player). This also enables an improvement in the operability of the manipulation input section.

In one of the above described embodiments, at least one of the image, sound, and given parameter may be changed in accordance with a given combination of the position on the screen, the absolute value of the amount of change in the position on the screen, and a changing direction of the position on the screen.

Since this embodiment makes it possible to cause changes in the images or the like in response to a wide range of combinations of manipulation inputs, it enables an increase in variations that impart special effects.

With one of the above described embodiments, at least one of the image, sound, and given parameter may be changed in accordance with a changing direction of the position on the screen.

This embodiment makes it possible to provide effective image representation of a direction that enables the cutting of an object and a direction that disables the cutting of the object, such as a grain of the object, which cannot be implemented by prior-art manipulation inputs, when generating an image of the cutting of an object that is displayed on the screen in accordance with the manipulation input of the operator, by way of example. It is therefore possible to obtain effective special effects that reflect a wide variety of manipulation inputs.

An embodiment of the present invention is described below with reference to the accompanying figures.

The embodiment described below relates to an example of application to a swordplay game in which a factor such as the position of the sword-shaped controller wielded by the player (generally speaking: a manipulation input section or object to be detected) is detected so that swordplay occurs against an enemy character that appears on the screen, but the present invention is not limited thereto and thus it can be applied to various other image generation systems.

1. Configuration

A schematic external perspective view of an image generation system in accordance with this embodiment when applied to an arcade game system is shown in FIG. 1.

In a game system 10, an image generated by the image generation system in accordance with this embodiment is displayed on a display device (display section) that is housed in a casing 20. The screen 30 is disposed in such a manner that it can be observed by a player manipulating a sword-shaped controller (generally speaking: an object to be detected) 40 that is a manipulation input section within a given area. In the description below, the horizontal direction of the screen 30 is taken to be the x-axis, the vertical direction of the screen 30 is taken to be the y-axis, and the depthwise direction perpendicular to the screen 30 is taken to be the z-axis.

The game system 10 implements a game in which the sword-shaped controller 40 wielded by the player is used to slash at an enemy character (object) that appears on the screen 30. In order to increase the feeling of a virtual reality, this game system 10 makes it possible to enjoy the strategies of swordplay, by faithfully reproducing the circumstances under which the sword-shaped controller 40 that is manipulated (such as wielded) by the player.

For that reason, the game system 10 detects the position on the screen 30 of the sword-shaped controller 40 wielded by the player within a given area, then performs processing to impart special effects (various special effects such as images (generally speaking: images) and sound effects (generally speaking: sounds), vibration, wind, or light), based on the thus-detected position, and cause changes in a capability value such as the attacking power or defending power of the character manipulated by the player (generally speaking: in parameters for changing an effect (such as an image, sound, or vibration)).

In this case, the game system 10 is provided with a detection device (input device) that detects factors such as the position and orientation of the sword-shaped controller 40 that is wielded by the player, by using two mutually parallel sensor planes (generally speaking: an area) that is formed by two tablet sensors (first and second sensors).

This detection device comprises first and second sensors 50 and 60. The first sensor 50 forms a first sensor plane 52 from a group of sensors. Each position in the first sensor plane 52 corresponds in a one-to-one fashion with a position on the screen 30. The second sensor 60 forms a second sensor plane 62 from a group of sensors. Each position in the second sensor plane 62 corresponds in a one-to-one fashion with a position on the screen 30. The first and second sensor planes 52 and 62 are formed to be disposed at a given displacement d.

The first sensor 50 makes it possible to specify a first position at which as word-shaped controller (generally speaking: an object to be detected) 40 traverses the first sensor plane 52. Similarly, the second sensor 60 makes it possible to specify the position at which this sword-shaped controller (generally speaking: an object to be detected) 40 traverses the second sensor plane 62.

The image generation system in accordance with this embodiment specifies a position on the screen 30 corresponding to the position of the sword-shaped controller within the first and second sensor planes, based on the first and second positions within the first and second sensor planes 52 and 62 of the sword-shaped controller 40, specified by the first and second sensors 50 and 60 (or information for specifying the first and second positions; generally speaking: input information from a detection device). Processing is done to impart various special-effects to the player, based on the thus-specified position on the screen.

This makes it possible for the image generation system in accordance with this embodiment to impart appropriate special effects that increase the feeling of virtual reality to the player using the sword (saber) in the game, in accordance with factors such as the position to which the player has swung the sword-shaped controller 40 (the position on the screen 30), the speed of the swing (generally speaking: the amount of change in position per unit time), the swing width (generally speaking: the absolute value of the amount of change in position), the orientation of the swing (generally speaking: the orientation in which the position has changed), or the orientation of the sword-shaped controller 40 with respect to the screen direction in the first and second sensor planes.

Since the first and second positions of the traverse through the first and second sensor planes 52 and 62 detected by the first and second sensors 50 and 60 are made to correspond to a position on the screen in this manner, it is not necessary to provide sensors in portions of the sword-shaped controller 40 wielded by the player. The manipulation input section wielded by the player is therefore not limited to a sword-shaped controller, so that any object that can traverse through the sensor plane could be used therefor, such as part of the body of the player (such as the player's fists, feet, and head).

In other words, not only does the use of such sensors make it possible to reduce the cost of the manipulation input section, it also makes it unnecessary to provide wiring within the casing 20 to transfer detection information from the manipulation input section. This also makes it possible to specify the position indicated by the sensor planes more accurately as a position on the screen 30.

Figure 2:
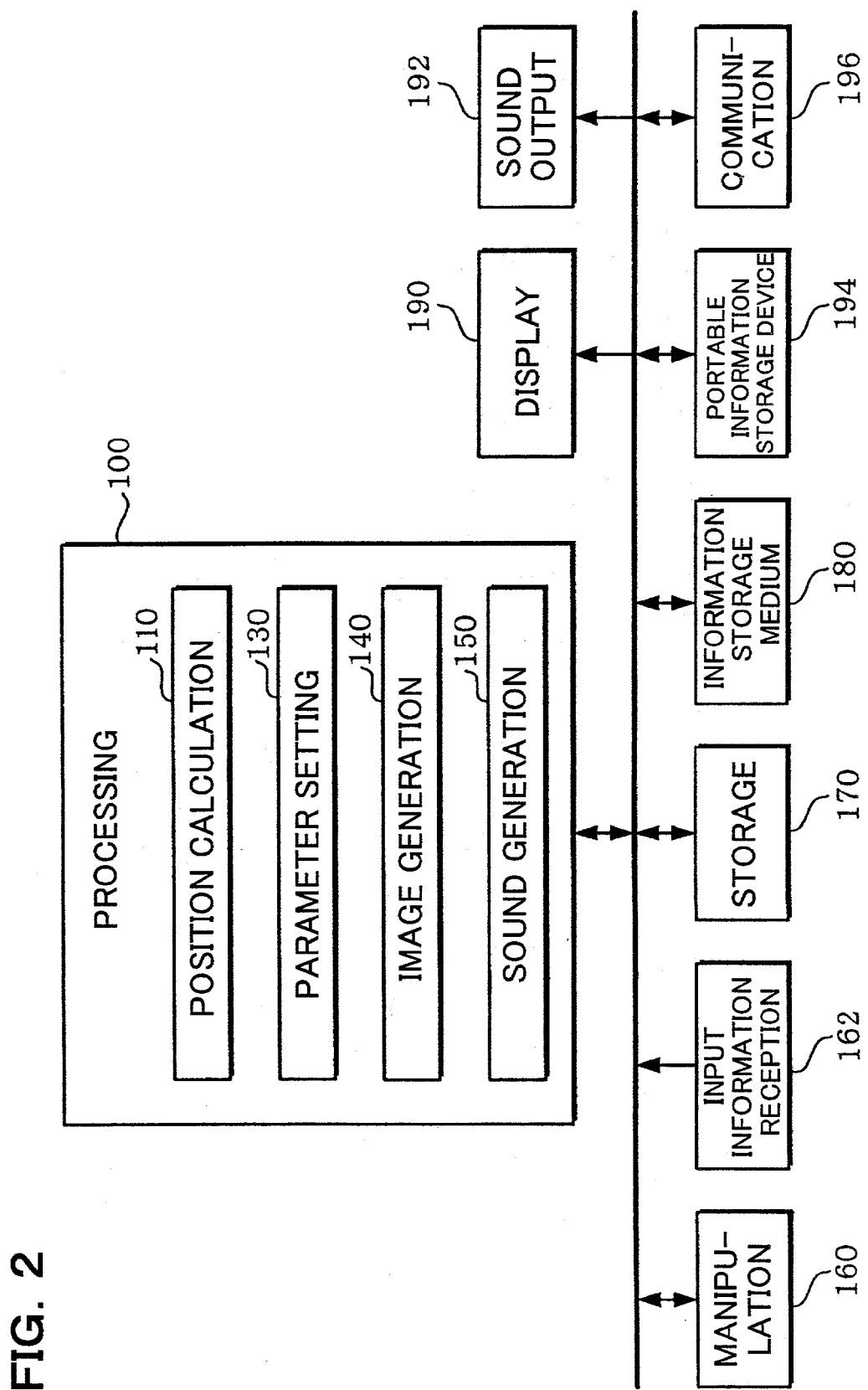
FIG. 2 is one example of a block diagram of an image generation system in accordance with this embodiment.

One example of a block diagram of an image generation system in accordance with this embodiment is shown in FIG. 2.

Note that the embodiment shown in FIG. 2 comprises at least a processing section 100 (or the processing section 100, an input information reception section 162, and a storage section 170; or the processing section 100, the input information reception section 162, the storage section 170, and an information storage medium 180), but other blocks (such as an manipulation section 160, a display section 190, an sound output section 192, the portable information storage device 194, and a communication section 196) can be implemented by any other structural components.

In this case, the processing section 100 performs various types of processing such as control over the entire system, the issuing of commands to the blocks within the system, game processing, image processing, or sound processing, and the functions thereof could be implemented by hardware such as various different processors (such as a CPU or DSP) or an ASIC (gate array), or by a given program (game program).

The manipulation section 160 is designed to enable the player to input operating data such as game settings, where the functions thereof could be implemented by hardware such as a joystick, buttons, a microphone, a sensor, or a casing.

The input information reception section 162 receives input information from the detection device for detecting the manipulation situation of a manipulation input section, such as the manipulation section 160 wielded by the player and another sword-shaped controller, where the functions thereof could be implemented by hardware such as an ASIC or a given program. If the detection device shown in FIG. 1 is connected, by way of example, coordinates of the first and second positions (or information for specifying the coordinates of the first and second positions) in the first and second sensor planes 52 and 62 that are detected by the first and second sensors 50 and 60 are received as input information.

The storage section 170 acts as a work area for components such as the processing section 100 and the communication section 196, where the functions thereof can be implemented by hardware such as RAM.

An information storage medium 180 (a storage medium that can be read by a computer) is designed to store information such as programs and data, and its functions could be implemented by hardware such as an optical disk (CD or DVD), a magneto-optical (MO) disk, a magnetic disk, a hard disk, magnetic tape, or ROM. The processing section 100 performs the various types of processing in accordance with the present invention (this embodiment), based on the information stored in this information storage medium 180. In other words, within the information storage medium 180 is stored (recorded) information (a program for causing the implementation of processing on a computer) that causes the computer to function as the various parts (particularly the blocks comprised within the processing section 100) of the present invention (this embodiment).

Note that all or part of the information stored in the information storage medium 180 can be transferred to the storage section 170 at a suitable time, such as at power-on. The information stored in the information storage medium 180 comprises at least one type of information, such as program coding for executing the processing in accordance with this embodiment, image data, sound data, shape data for display objects, table data, list data, player information, information for instructing processing in accordance with the present invention, or information for performing processing in accordance with such instructions.

The display section 190 is designed to output images created by this embodiment of the present invention, and the functions thereof can be implemented by hardware such as a CRT, LCD panel, or head-mounted display (HMD).

The sound output section 192 is designed to output sounds created by this embodiment of the present invention and the functions thereof can be implemented by hardware such as a speaker.

The portable information storage device 194 stores data such as a player's personal data and saved data, and various devices such as a memory card or a portable game machine could be conceived as this portable information storage device 194.

The communication section 196 provides various types of control for communicating with an external device (such as a host device or another image generation system), and the functions thereof can be implemented by hardware such as various types of processor or a communication ASIC, or by a program.

Note that a program or data for causing the implementation of the various processes of the present invention (this embodiment) on a computer could be distributed to the information storage medium 180 from an information storage medium possessed by a host device (server), through a network and the communication section 196. Such use of an information storage medium on the host device (server) is comprised within the scope of the present invention.

The processing section 100 (processor) performs various types of processing, such as game processing, image generation processing, or sound generation processing, based on manipulation data or input information from the manipulation section 160 or the input information reception section 162 and a program. In such a case, the processing section 100 uses a storage area within the storage section 170 as a work area for the processing.

In this case, the processing performed by the processing section 100 could be: processing for accepting a coin (or equivalent), processing for moving the game forward, processing for updating various parameters (generally speaking: various parameters for changing special-effect images) relating to the attacking power or defending power imparted to the character manipulated by the player as the game progresses, processing for setting a selection screen, processing for obtaining the position and rotational angle (rotational angle about the X-, Y-, or Z-axis) of an object (one or more primitive surfaces), processing for making an object operate (motion processing), processing for obtaining a viewpoint position (position of a virtual camera) and line-of-sight angle (rotational direction of the virtual camera), processing for disposing an object such as a map object in an object space, hit check processing, processing for calculating the game results (effects or score), processing to enable a plurality of players to play in a common game space, or game-over processing.

The processing section 100 comprises a position calculation section 110, a parameter setting section 130, an image generation section 140, and a sound generation section 150. Note that it is not necessary to comprise all of the functional blocks 110 to 150 within the processing section 100, and some of these functional blocks could be omitted.

In this case, the position calculation section 110 performs processing to obtain data such as position on the screen of the display section 190, based on input information from the detection device that is received by the input information reception section 162. More specifically, the position calculation section 110 searches for the position on the screen of the display section 190 that corresponds to the first and second sensor planes, based on the coordinates of the first and second positions in the first and second sensor planes of the object to be detected (the sword-shaped controller 40 of FIG. 1) that is detected by the detection device. In addition, the position calculation section 110 obtains the amount of change (absolute value) per unit time of the thus-obtained position on the screen, the amount of change (absolute value) of that position on the screen, the orientation of the change of position on the screen, and the orientation with respect to the screen direction of the object to be detected in the first and second sensor planes.

The parameter setting section 130 reflects the results of the game processing that is based on factors such as the position on the screen 30 obtained by the position calculation section 110, and performs processing to update the parameters for changing the special-effects. More specifically, the parameter setting section 130 updates parameters relating to the life points, attacking power, and defending power of the character manipulated by the player, for example, to cause changes in special-effect images and sound effects as a result.

The image generation section 140 generates an image as seen from a given viewpoint (virtual camera) within the object space, based on the game processing results, for output to the display section 190.

More specifically, the image generation section 140 first performs various geometrical processes such as coordinate conversion, rest processing, transparency conversion, or light-source computation, then it creates drawing data (such as position coordinates, texture coordinates, color (luminance) data, normal vectors, or α values to be imparted to vertices), based on the results of this processing.

The image generation section 140 then draws an image (formed of one or more primitive surfaces) after the geometrical processing, based on this drawing data, into a drawing area (an area capable of storing image information in pixel units, such as a frame buffer or work buffer) within the storage section 170. During this time, the image generation section 140 performs processing such as mapping a texture onto an object.

The image generation section 140 of this embodiment performs processing to generate an image as a special effect, based on data such as the position on the screen corresponding to the position of the object to be detected in the first and second sensor planes that has been obtained by the position calculation section 110. In other words, the feeling of a virtual reality imparted to the player, who is making use of the sword-shaped controller 40 as a manipulation input section to repeatedly fight against an enemy character appearing on the screen 30, can be increased by generating more effective special-effect images for display on the screen 30.

The sound generation section 150 performs various types of sound processing based on the game processing results, to generate game sounds such as background music, sound effects, and voices, and outputs them to the sound output section 192.

The sound generation section 150 of this embodiment also performs processing to generate sounds as special effects, based on data such as the position on the screen that has been obtained by the position calculation section 110. In other words, the feeling of a virtual reality imparted to the player, who is making use of the sword-shaped controller 40 as a manipulation input section to repeatedly fight against an enemy character appearing on the screen 30, can be increased by generating and outputting more effective special-effect sounds.

Note that the game system to which the image generation system of this embodiment is applied could be used in a system with a dedicated single-player mode, which enables one player to play the game, or it could also be used in a system provided with a multi-player mode, which enables a plurality of players to play.

If a plurality of players is playing, the game images and game sounds supplied to this plurality of players could be created by using one terminal, or they could be created by using a plurality of terminals (game machines or mobile phones) connected by a network (transmission lines or communication circuitry) or the like.

2. Description of this Embodiment

The image generation system in accordance with this embodiment obtains a position on the screen of the detection device from the position of the manipulation input section (object to be detected) within the sensor planes formed by the detection device of FIG. 1, and generates an image based on that position or a change in position obtained from that position.

The description first concerns the principle of the detection of factors such as the position of the manipulation input section wielded by the player, in the image generation system of this embodiment.

2.1 Detection of Manipulation Input Section Position

In this embodiment, the positions on the screen at which images generated by the image generation system are displayed and the positions in the sensor planes formed by the above described detection device are associated in a one-to-one manner. If the positions at which the manipulation input section traverses the sensor planes can be detected, therefore, it can be easy to specify the positions of the manipulation input section on the screen.

Figure 3A:
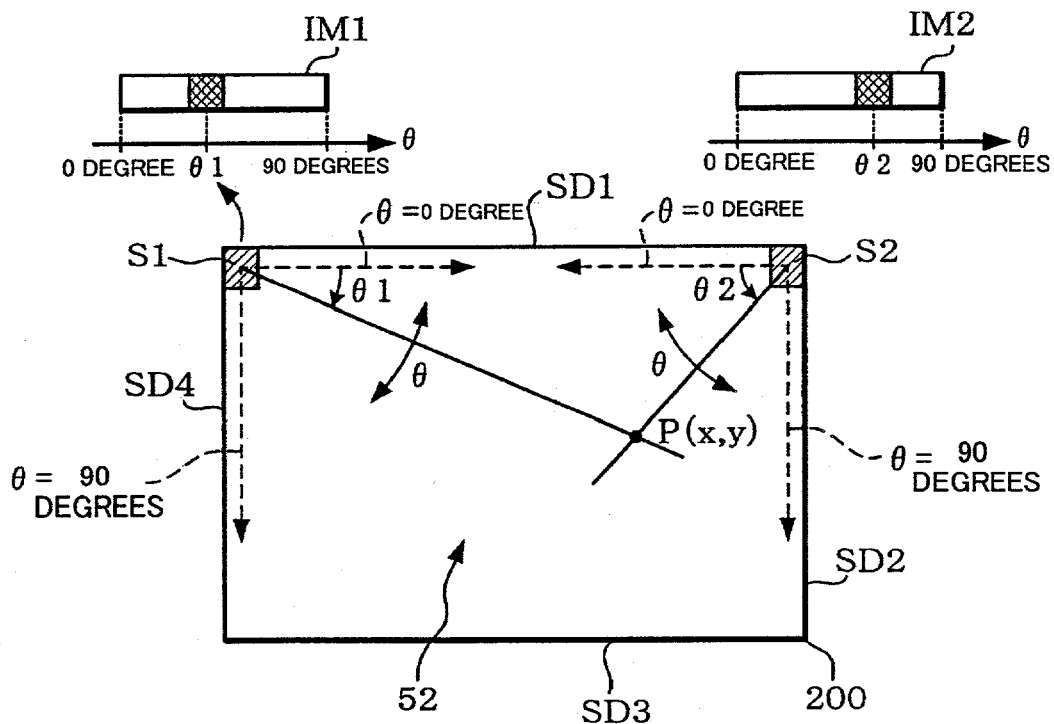
FIGS. 3A and 3B are views illustrating the principle of detecting the position of the manipulation input section within the sensor planes formed by the detection device.
Figure 3B:
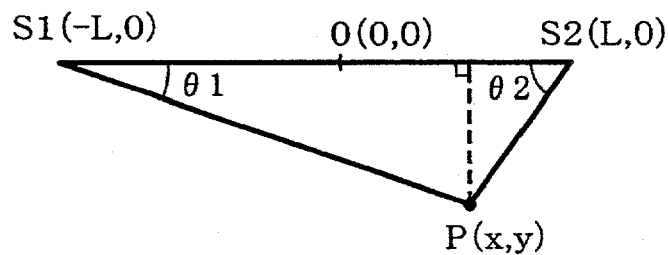

Views illustrating the principle of detecting the position of the manipulation input section within the sensor planes formed by the above described detection device as shown in FIGS. 3A and 3B.

In this case, the description concerns the principle of the detection of the first position by the first sensor 50, but the principle of the detection of the second position by the second sensor 50 is similar.

The first sensor 50 forms the two-dimensional first sensor plane 52 within a first sensor plane frame 200, as shown in FIG. 3A. A groups of S1 and S2 are disposed at the two corners of a first side SD1 of the first sensor plane frame 200.

The sensor S1 has a light-emitting section and a light-receiving section. The light-emitting section outputs infrared light through an angle $\theta$ that is between zero degrees and 90 degrees, and the returning light is received by the light-receiving section. For that reason, a reflective plate is disposed within the sides SD1 to SD4 of the first sensor plane frame 200, to ensure that infrared light from the light-emitting section of the sensor is reflected into the light-receiving section.

The sensor S2 also has a light-emitting section and a light-receiving section, in a manner similar to that of the sensor S1, and it also emits its own infrared light through an angle $\theta$ that is between zero degrees and 90 degrees and receives the returning light.

The thus-configured sensors S1 and S2 are provided in such a manner that the directions at which the angle $\theta$ thereof is at zero are mutual opposite. This ensures that the first sensor plane 52 that is a two-dimensional plane formed by the sensors S1 and S2 is configured within the first sensor plane frame 200.

The result of receiving light through the angle $\theta$ between zero degrees and 90 degrees by the sensor S1 is obtained as a formed image IM1 in the first sensor 50. Similarly, the result of receiving light through the angle $\theta$ between zero degrees and 90 degrees by the sensor S2 is obtained as a formed image IM2 in the first sensor 50.

The formed images IM1 and IM2 are such that, when the manipulation input section controlled by the player traverses the first sensor plane 52 as the object to be detected, portions of the emitted infrared light not shaded by the object to be detected are reflected by the reflective plate provided along each edge and are received by the light-receiving section, but portions of the emitted infrared light shaded by the object to be detected are not reflected by the reflective plate provided along each edge. The formed images IM1 and IM2 therefore represent only the portions of the object to be detected that cast shadows. In other words, the formed images IM1 and IM2 make it possible to determine a portion that has cast a shadow as angles $\theta 1$ and $\theta 2$.

Note that it is also possible to provide no reflective plate along the edges of the first sensor plane frame 200 but a reflective plate on the manipulation input section instead. In such a case, if the manipulation input section which is the object to be detected traverses the first sensor plane 52, the portion that is not covered by the object to be detected is represented by a shadow, so the portion that is not shadow in the formed images IM1 and IM2 can be determined to be the angles $\theta 1$ and $\theta 2$.

Since the positions of the sensors S1 and S2 are fixed, the manipulation input section can specify the position at which the first sensor plane 52 is traversed from the angles $\theta 1$ and $\theta 2$, as P (x, y).

In this case, assume that the center point of the first side SD1 of the first sensor plane frame 200 is the origin (0, 0), the length of the first side SD1 is 2L, and the coordinates of the sensors S1 and S2 are (−L, 0) and (L, 0) respectively. In such a case, the coordinates of P (x, y) can be obtained from the following equations:

$$\tan \theta1 = y/(x+L) \quad (1)$$

$$\tan \theta2 = y/(L-x) \quad (2)$$

From the above, the coordinates of the position P at which the manipulation input section traverses the first sensor plane 52 can be specified. In a similar manner, the position at which the manipulation input traverses the second sensor plane 62 can be specified.

It is therefore possible for the image generation system of this embodiment to easily specify the position on the screen corresponding to the position at which the manipulation input section traverses the first sensor plane 52, by linking each position in the first sensor plane 52 formed within the first sensor plane frame 200 to each position in the screen on which the image generated by this embodiment is displayed, in a one-to-one manner.

Note that the description of this embodiment concerns a case in which first and second positions in the first and second sensor planes 52 and 62 are specified by the first and second sensors 50 and 60 in this embodiment, and those positions are supplied as input information to the image generation system, but the present invention is not limited thereto. For example, the configuration could be such that the angles θ1 and θ2 obtained from the formed images IM1 and IM2 in the first and second sensors 50 and 60 are supplied to the image generation system and the image generation system specifies a position on the screen after obtaining the positions in the first and second sensor planes 52 and 62 as described above.

Since the specification of the position of the manipulation input section on the screen could be done by one of the above described sensor planes alone, it is also possible to use the position obtained by either of the first and second sensor planes 52 and 62 as a representative value. With this embodiment, the position in the first sensor plane 52 is used as a representative value.

2.2 Detection of Speed of Manipulation Input Section Movement

Figure 4:
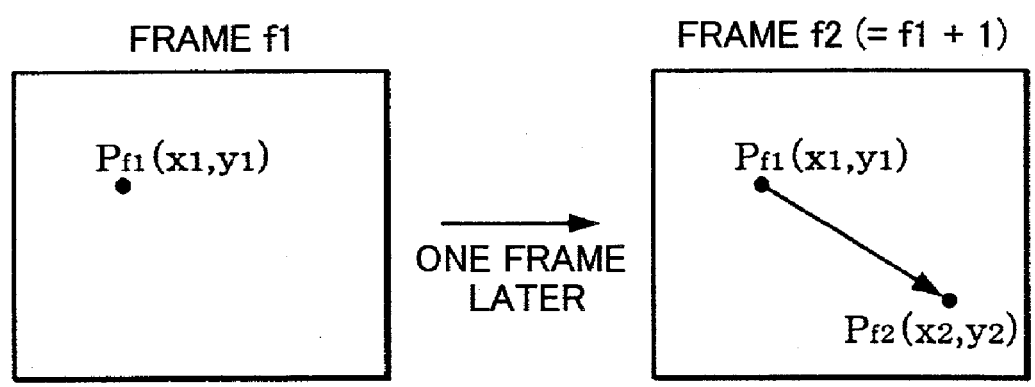
FIG. 4 is a view illustrating the principle of detecting the speed of movement of the manipulation input section within the sensor plane formed by the detection device.

A view illustrating the principle of detecting the speed of movement of the manipulation input section within the sensor plane formed by the above described detection device of this embodiment is shown in FIG. 4.

In this embodiment, an image is generated in real-time, such as every given frame period (for example, every 1/60 second or 1/30 second). It is possible to obtain the amount of change per unit time at the first sensor plane 52 by taking this frame period as a unit time and by obtaining the amount of change between a position $P_{f1}$ (x1, y1) in the first sensor plane 52 that is obtained in a given frame f1 and a position $P_{f2}$ (x2, y2) obtained in the next frame f2 (=f1+1).

The amount of change per unit time can be assumed to be the speed at which the manipulation input section moves (such as the speed at which the sword-shaped controller is swung).

It is possible to assume that the direction in which the manipulation input section moves (such as the direction in which the sword-shaped controller is swung) can be obtained by obtaining the direction of change from the position $P_{f1}$ (x1, y1) in the first sensor plane 52 to $P_{f2}$ (x2, y2) in the first sensor plane 52 that is obtained in the next frame f2 (=f1+1).

It is also possible to assume that the distance through which the manipulation input section moves (such as the width of swing of the sword-shaped controller) can be obtained by obtaining the absolute value of the amount by which the position $P_{f1}$ (x1, y1) in the first sensor plane 52 changes to $P_{f2}$ (x2, y2) in the first sensor plane 52 that is obtained in the next frame f2 (=f1+1).

Since the specification of the speed, orientation, and distance of the movement of the manipulation input section could be done by one of the above described sensor planes alone, it is also possible to use the values obtained by either of the first and second sensor planes 52 and 62 as representative values. If the first and second sensor planes 52 and 62 are used, values obtained by either sensor plane can be used as representative values. With this embodiment, the values obtained by the first sensor plane 52 are used as representative values.

Figure 5A:
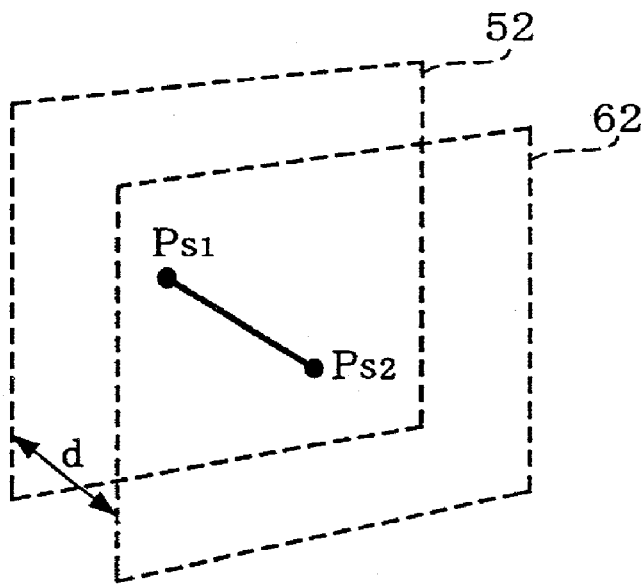
FIGS. 5A and 5B are views illustrating the principle of detecting the orientation of the manipulation input section with respect to the screen, by the detection device.
Figure 5B:
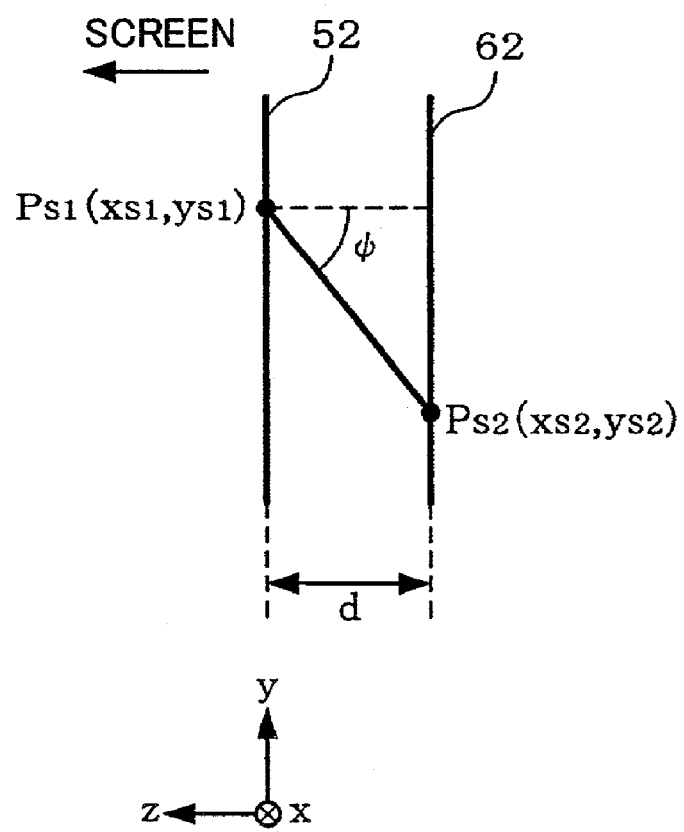

2.3 Detection of Orientation of Manipulation Input Section With Respect to Screen Views illustrating the principle of detecting the orientation of the manipulation input section with respect to the screen, by the above described detection device, are shown in FIGS. 5A and 5B.

As shown in FIG. 5A, the first and second sensor planes 52 and 62 are formed at a displacement d by the two tablet sensors of the detection device. In this case, assume that position at which the manipulation input section wielded by the player traverses the first sensor plane 52 is $P_{S1}$ and the position at which it traverses the second sensor plane 62 is $P_{S2}$.

During this time, the orientation of the manipulation input section with respect to the screen is given by the angle subtended by the line linking the position $P_{S1}$ of the traverse through the first sensor plane 52 and the position $P_{S2}$ of the traverse through the second sensor plane 62, with respect to the first or second sensor plane 52 or 62.

In other words, if it is assumed that the position $P_{S1}$ (xs1, ys1) is where the first sensor plane 52 is traversed and the position $P_{S2}$ (xs2, ys2) is where the second sensor plane 62 is traversed, the x component of the orientation φ of the manipulation input section with respect to the screen can be obtained as φx and the y component thereof as φy, from the following equations:

$$\tan \phi x = (xs1 - xs2)/d \quad (3)$$

$$\tan \phi y = (ys1 - ys2)/d \quad (4)$$

In this manner, if the position at which the manipulation input section traverses each sensor plane can be specified, it is simple to obtain the orientation of the manipulation input section with respect to the screen, from the positions in the first and second sensor planes.

2.4 Practical Examples

If an image generation system that enables the specification of details such as the position of the manipulation input section wielded by the player on the screen, based on input information from a detection device, is applied to a sword-play game, it is possible to apply the features described below in order to increase the player's feeling of a virtual reality.

2.4.1 Attacking Power Corresponding to Swing Speed of Sword

Figure 6A:
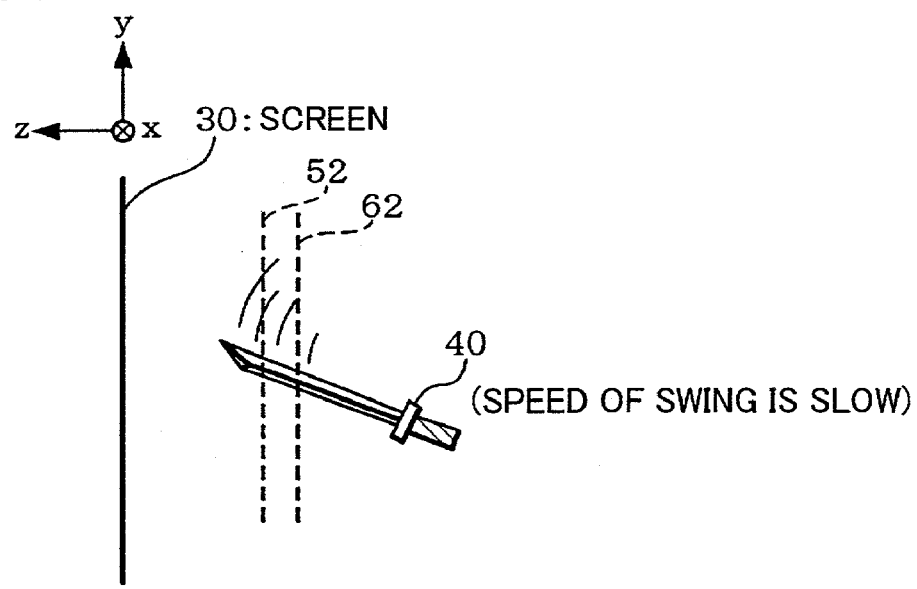
FIGS. 6A and 6B are views schematically illustrating an example in which attacking power changes in accordance with the speed at which the manipulation input section is swung.
Figure 6B:
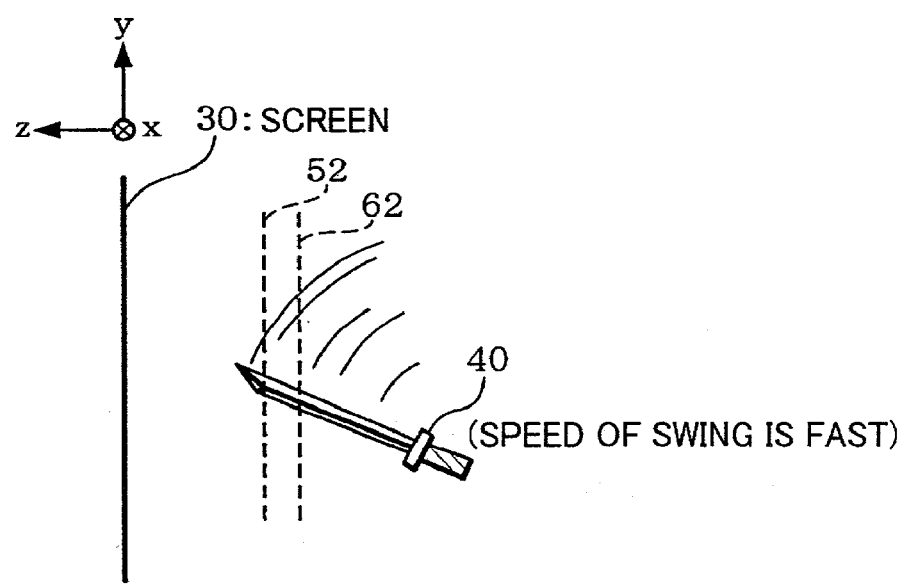

Schematic views of an example in which attacking power changes in accordance with the speed at which the sword-shaped controller 40 that is the manipulation input section is swung are shown in FIGS. 6A and 6B.

In other words, since the image generation system of this embodiment can obtain the speed at which the sword-shaped controller 40 is swung, based on input information from the above described detection device, it is possible to cause a change in the attacking power of the character manipulated by the player (generally speaking: a parameter) in response to the speed of the swing.

If there is an enemy character (object) within a given range from the position of the virtual player within the object space and the player swings the sword-shaped controller 40, processing is done to impart damage (a reduction in the life force (physical strength) of the enemy character), based on the position on the screen that is obtained in correspondence with the position of the sword-shaped controller 40 in the first and second sensor planes. In particular, damage can be imparted on condition that part of the enemy character (object) is on the track of the positions obtained on the screen.

During this time, the player can swing the sword-shaped controller 40 freely as if swinging a real-life sword, so that the game processing can be set to not increase the attacking power if the speed of the swing is slow, as in FIG. 6A, but increase the attacking power if the speed of the swing is fast, as in FIG. 6B. This makes it possible to change the magnitude of the damage imparted to the enemy character on the screen 30, enabling a great increase in the feeling of a virtual reality caused by fighting with a sword.

Figure 7A:
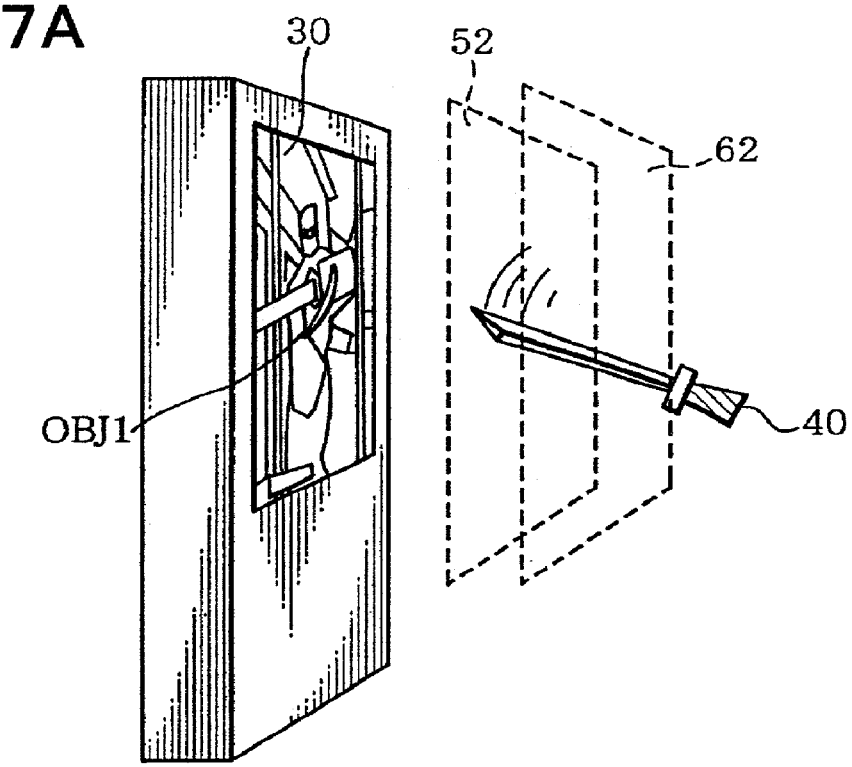
FIGS. 7A and 7B are further views schematically illustrating an example in which attacking power changes in accordance with the speed at which the manipulation input section is swung.
Figure 7B:
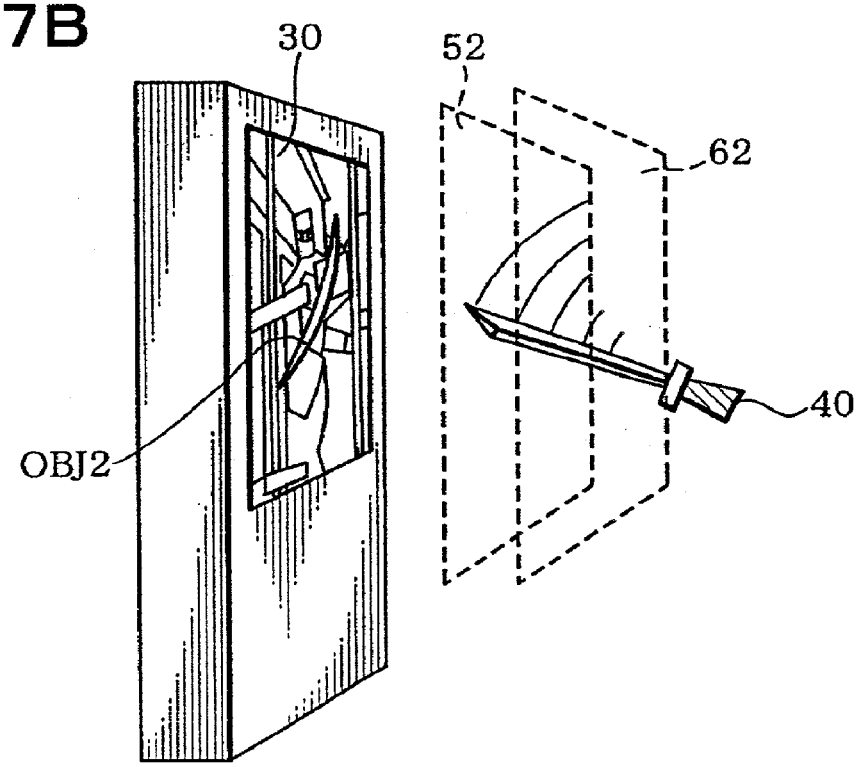

When damage is imparted to the enemy character and a sword slash mark object corresponding to that damage is displayed, the magnitude of that sword slash mark object could be varied in response to the damage (or attacking power) that is imparted. For example, if the speed at which the sword-shaped controller 40 is swung is slow, a slash mark object OBJ1 indicating that small damage has been imparted to the enemy can be displayed, as shown in FIG. 7A, whereas if the speed at which the sword-shaped controller 40 is swung is fast, a slash mark object OBJ2 indicating that large damage has been imparted to the enemy can be displayed, as shown in FIG. 7B. In particular, the configuration could be such that a sword slash mark object corresponding to the orientation thereof is displayed over the enemy character, to enable the player to determine the orientation of the swing of the sword-shaped controller 40.

It is also possible to cause a change in a sound effect that imitates the sword cutting through the air, in accordance with the magnitude of the speed of the swing of the sword-shaped controller 40, for output.

In this manner, it is possible to change a special effect that is imparted to the player by changing a special-effect image, a sound effect, or a parameter such as the attacking power of the character manipulated by the player (generally speaking: a parameter that causes a change in a special-effect image) in accordance with the magnitude of the speed with which the sword-shaped controller 40 is swung, enabling a great improvement in the feeling of a virtual reality in which the player uses a sword in swordplay.

Note that a given threshold could be provided for the speed with which the player swings the sword-shaped controller 40. In other words, if the player has swung the sword-shaped controller 40 at a speed that is at least as high as the given threshold, it is determined to be an attack against the enemy character. This makes it possible to avoid a situation in which the enemy character attacks, which might occur if the player moves the sword-shaped controller 40 gently without intending to attack the enemy character. This ensures that there is no loss of the feeling of a virtual reality in the game, if an attack on the enemy character is determined to be a swing of the sword-shaped controller 40 at a speed above the threshold.

2.4.2 Attacking Power Corresponding to Swing Width of Sword

Figure 8A:
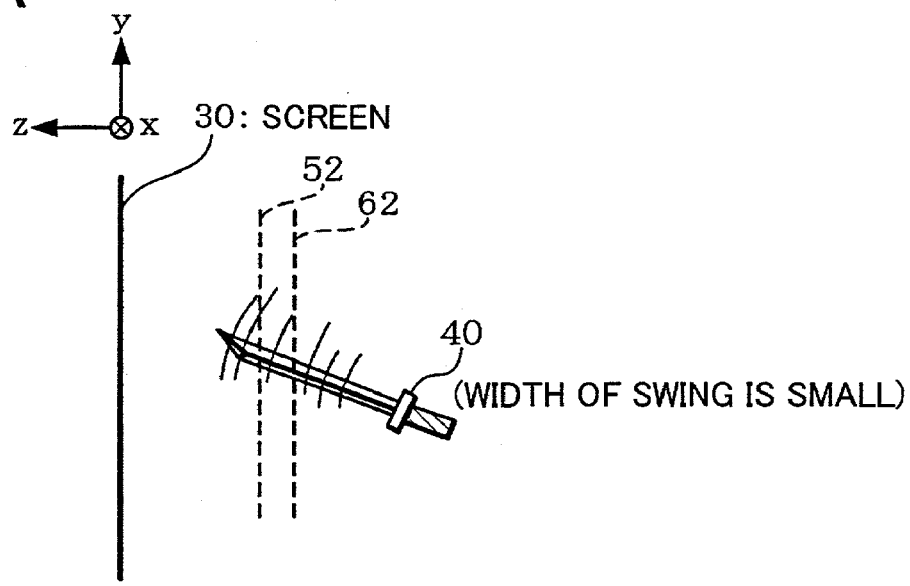
FIGS. 8A and 8B are views schematically illustrating an example in which attacking power changes in accordance with the width through which the manipulation input section is swung.
Figure 8B:
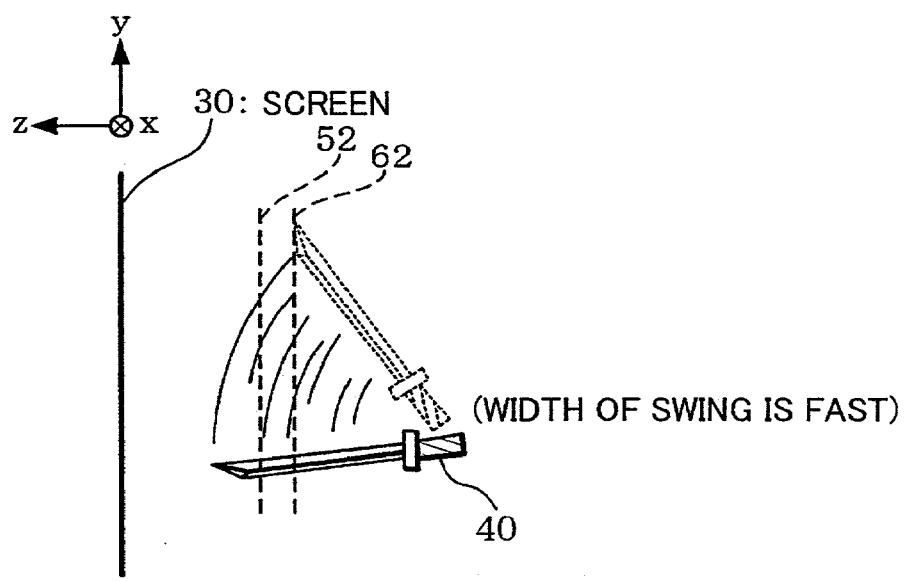

A schematic view of an example in which attacking power changes in accordance with the swing width of the sword-shaped controller 40 as the manipulation input section is shown in FIGS. 8A and 8B.

In other words, since the image generation system of this embodiment can obtain the swing width of the sword-shaped controller 40, based on input information from the above described detection device, it is possible to cause a change in the attacking power of the character manipulated by the player (generally speaking: a parameter) in response to the width of the swing.

The configuration can therefore be such that at least one of a special-effect image, a sound effect, and the attacking power (generally speaking: a parameter) of the character manipulated by the player can be made to change in accordance with the speed at which the above described sword-shaped controller 40 is swung.

If there is an enemy character (object) within a given range from the position of the virtual player within the object space and the player swings the sword-shaped controller 40, processing is done to impart damage (a reduction in the life force (physical strength) of the enemy character), based on the obtained position on the screen.

During this time, the player can swing the sword-shaped controller 40 freely as if swinging a real-life sword, so that the game processing can be set to not increase the attacking power if the width of the swing is small, as in FIG. 8A, but increase the attacking power if the width of the swing is fast, as in FIG. 8B. This makes it possible to change the magnitude of the damage imparted to the enemy character on the screen 30, enabling a great increase in the feeling of a virtual reality caused by fighting with a sword.

Figure 9A:
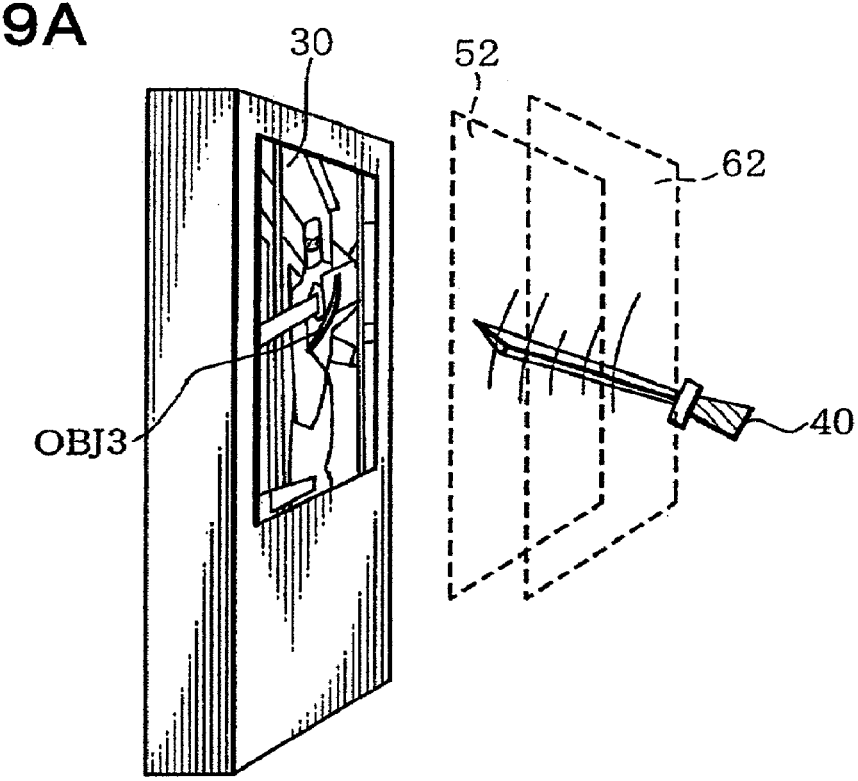
FIGS. 9A and 9B are further views schematically illustrating an example in which attacking power changes in accordance with the width through which the manipulation input section is swung.
Figure 9B:
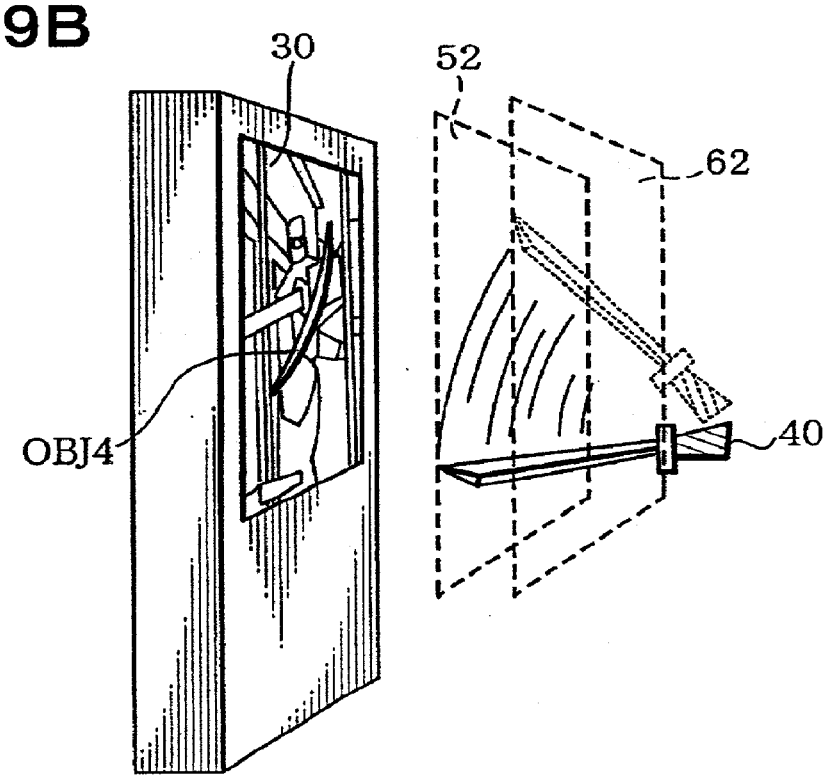

When damage is imparted to the enemy character and a sword slash mark object corresponding to that damage is displayed, the magnitude of that sword slash mark object could be varied in response to the damage (or attacking power) that is imparted. For example, if the width through which the sword-shaped controller 40 is swung is small, a slash mark object OBJ3 indicating that small damage has been imparted to the enemy can be displayed, as shown in FIG. 9A, whereas if the width through which the sword-shaped controller 40 is swung is large, a slash mark object OBJ4 indicating that large damage has been imparted to the enemy can be displayed, as shown in FIG. 9B. In particular, the configuration could be such that a sword slash mark object corresponding to the orientation thereof is displayed over the enemy character, to enable the player to determine the orientation of the swing of the sword-shaped controller 40.

It is also possible to cause a change in a sound effect that imitates the sword cutting through the air, in accordance with the width of the swing of the sword-shaped controller 40, for output.

It is thus possible to greatly improve the feeling of a virtual reality in which the player uses a sword in swordplay, by causing a change in a special effect that is imparted to the player by changing a special-effect image, a sound effect, or a parameter such as the attacking power of the character manipulated by the player (generally speaking: a parameter for changing a special-effect image) in accordance with the width of swing of the sword-shaped controller 40.

Note that a given threshold could be provided for the width through which the player swings the sword-shaped controller 40. In other words, if the player has swung the sword-shaped controller 40 through a width that is at least as high as the given threshold, it is determined to be an attack against the enemy character. This ensures that a small width of swing of the sword-shaped controller 40 by the player is not interpreted as an attack against the enemy character. If only the speed at which the sword-shaped controller 40 is swung is determined, as described above, the player would be able to topple the enemy character by simply swinging the sword-shaped controller 40 a small amount, which would lack interest as a game. It is therefore possible to prevent any loss of the feeling of a virtual reality in the game by determining that an attack with respect to the enemy character has occurred when the width of swing of the sword-shaped controller 40 is at least as great as a threshold.

2.4.3 Attack and Defense Corresponding to Orientation of Sword with Respect to Screen A game in which the player just attacks enemy characters that appear on the screen, as described above, is such that the player simply wields the sword-shaped controller 40 to topple enemy characters in sequence. Since the enemy characters can also launch attacks on the player in succession, at some point the life points of the player will reach zero and the game will be over. The playability of such a game therefore deteriorates and the player becomes bored with it.

For that reason, it is preferable that the configuration is such that the player can defend against attacks from enemy characters. This provides gaps in the actions of the enemy character while the player is defending against an attack from an enemy character, making it possible to enjoy a strategy of attack and defense by attacking and toppling that enemy character, thus enabling a great improvement in the feeling of a virtual reality as a swordplay game.

For that reason, the image generation system in accordance with this embodiment makes it possible for the player to switch between an attacking stance with respect to the enemy character and a defensive stance with respect to attacks from the enemy character, by determining the orientation of the sword-shaped controller 40 with respect to the screen. When the player is in an attacking stance with respect to the enemy character, the attacking power could be changed in accordance with the speed at which the above described sword-shaped controller 40 is swung and the swing width thereof.

Figure 10A:
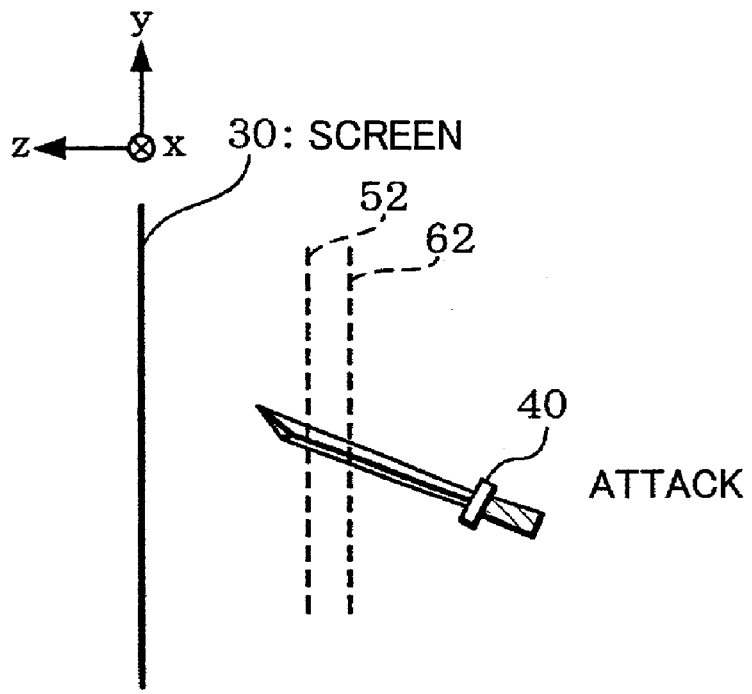
FIGS. 10A and 10B are views schematically illustrating an example in which the attacking or defensive stance changes in accordance with the orientation of the manipulation input section with respect to the screen.
Figure 10B:
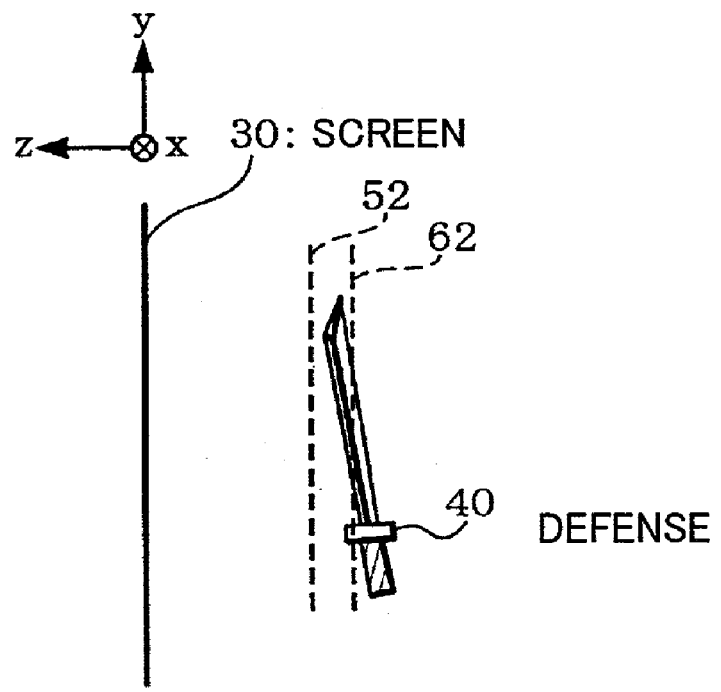

An example in which the attacking or defensive stance changes in accordance with the orientation of the sword-shaped controller 40 that is the manipulation input section with respect to the screen 30 is shown in FIGS. 10A and 10B.

In other words, since the image generation system in accordance with this embodiment can obtain the orientation of the sword-shaped controller 40 with respect to the screen 30, based on input information from the above described detection device, it is possible for the player to change the defending power (generally speaking: a parameter) of the character with respect to attacks from enemy characters in accordance with this orientation, in addition to attacking the enemy characters.

Assume that the player can take up an attacking stance in which the sword-shaped controller 40 is vertical with respect to the screen, as shown by way of example in FIG. 10A, and a defensive stance which the sword-shaped controller 40 rests with respect to the screen, as shown in FIG. 10B. This enables various forms of attack in the attacking stance in accordance with the above described speed of swing and swing width (conversely, the diversity of attacks in accordance with the above described speed of swing and swing width become impossible when the sword-shaped controller 40 is in a rest state with respect to the screen 30).

In this manner, it is possible for the player to enjoy the strategy of battling against an enemy character, by enabling switching of the player's attacking stance and defensive stance in accordance with the orientation of the sword-shaped controller 40 with respect to the screen 30, thus enabling a great improvement in the feeling of a virtual reality in which the player uses a sword in swordplay.

If there is an attack from the enemy, as described above, this embodiment makes it possible to defend against the attack of the enemy character. In such a case, the configuration is such that the player can counteract the attack and repulse the enemy character, provided that the condition is met that a given relationship is satisfied, such as the positions on the screen of the sword of the enemy character and the sword-shaped controller wielded by the player. If that happens, the player can recover from defense and start an attack on that enemy character that has sprung the attack.

Figure 11:
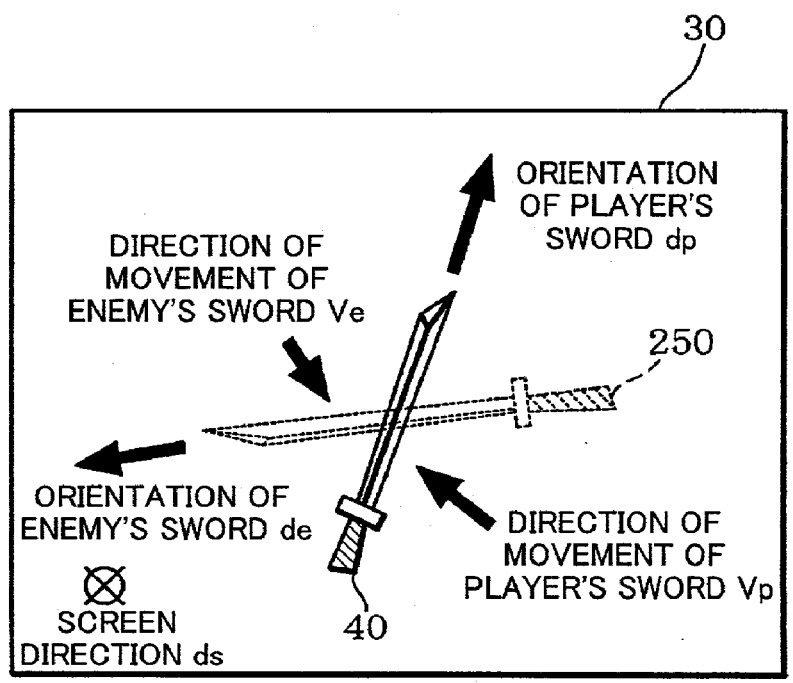
FIG. 11 is a view schematically illustrating a given relationship between the sword of the enemy character and the sword-shaped controller, in order to repulse the enemy character in accordance with this embodiment.
Figure 11:
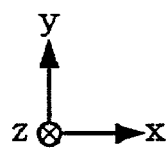

A given relationship between the sword of the enemy character and the sword-shaped controller wielded by the player, in order to repulse such an attack of the enemy character, is shown in FIG. 11.

In this case, a sword object 250 of the enemy character has appeared as an object image in the depthwise direction z of the screen 30. The game system to which the image generation system in accordance with this embodiment is applied determines whether or not the attack of the enemy character is repulsed by determining how the sword-shaped controller 40 that is the manipulation input section of the player is orientated with respect to the sword object 250 of the enemy character that appears on this screen 30.

Note that the direction that is the same as the depthwise direction z of the screen 30 is denoted by z, the orientation of the sword object 250 of the enemy character is denoted by de, the direction of movement of the sword object 250 is denoted by Ve, the orientation of the sword-shaped controller 40 wielded by the player is denoted by dp, and the direction of movement of the sword-shaped controller 40 is denoted by Vp.

Figure 12:
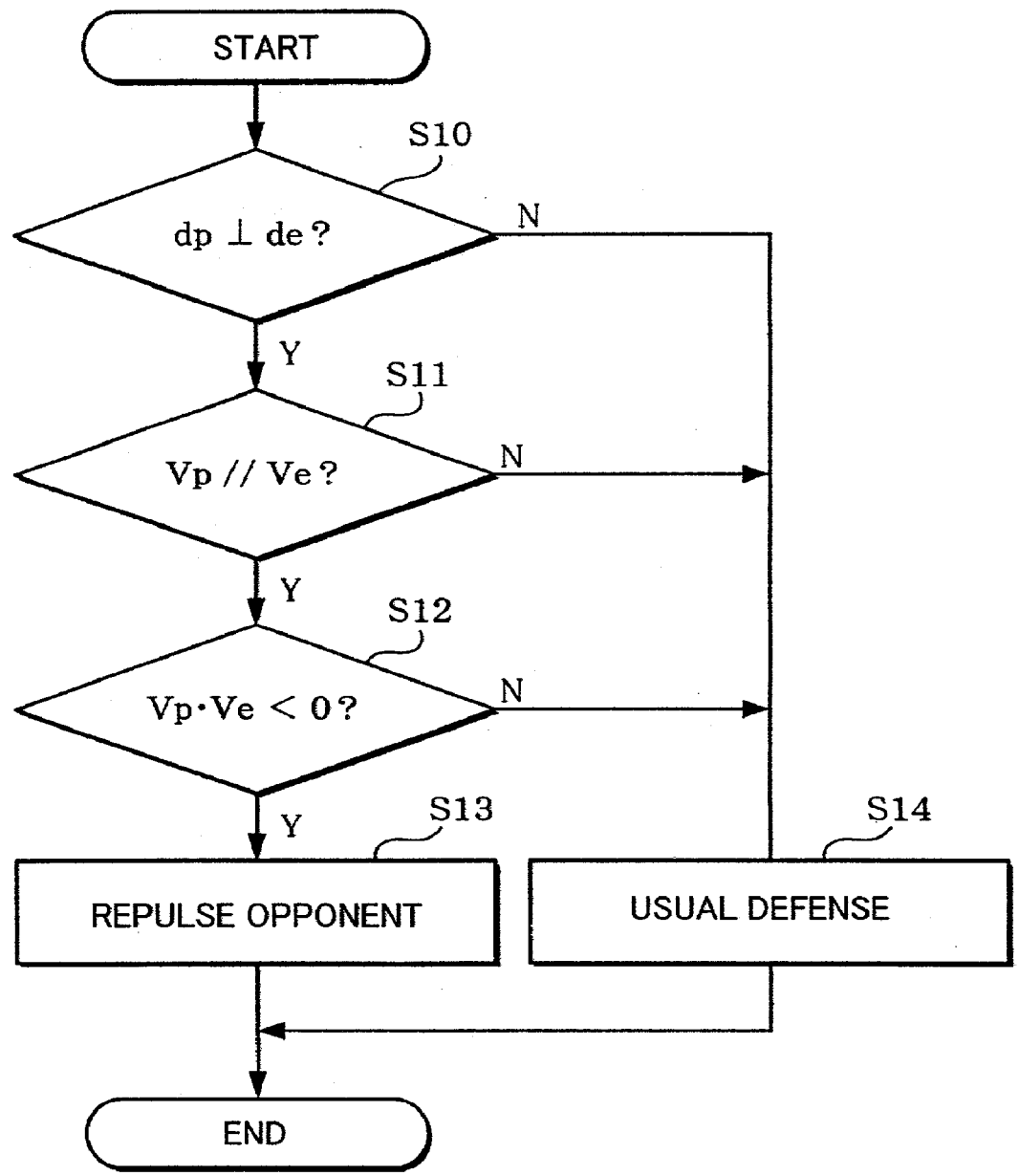
FIG. 12 is a flowchart of an example of the processing for determining whether or not the attack of the enemy character is to be repulsed by the action of the player in accordance with this embodiment.

One example of a flowchart of the processing for determining whether or not the attack of the enemy character has been repulsed by the action of the player is shown in FIG. 12.

First of all, the system determines whether or not the sword-shaped controller 40 wielded by the player is at rest with respect to the screen 30, as shown in FIG. 10B, and, if it is determined to be at rest, the player assumes a defensive stance with respect to attacks from the enemy character.

During this time, the system determines whether or not the orientation dp of the sword-shaped controller 40 crosses the orientation de of the sword object 250 of the enemy character (step S10). In this case, it is preferable that the system determines whether or not the angle subtended between dp and de is substantially orthogonal within a given range.

If it has been determined that the angle between dp and de is (substantially) orthogonal (Y at step S10), the system determines whether or not the direction of movement Vp of the sword-shaped controller 40 and the direction of movement Ve of the sword object 250 are parallel (step S11). In this case, it is preferable that the system determines whether or not Vp and Ve are substantially parallel, within a given range.

If it has been determined that Vp and Ve are (substantially) parallel (Y at step S11), the system determines whether or not the inner product of Vp and Ve is negative, in other words, whether or not the direction of movement of the sword-shaped controller 40 and the direction of movement of the sword object 250 are mutually opposite (step S12). This makes it possible to determine whether or not the sword-shaped controller 40 is forcing back the sword object 250 of the enemy character.

Figure 13A:
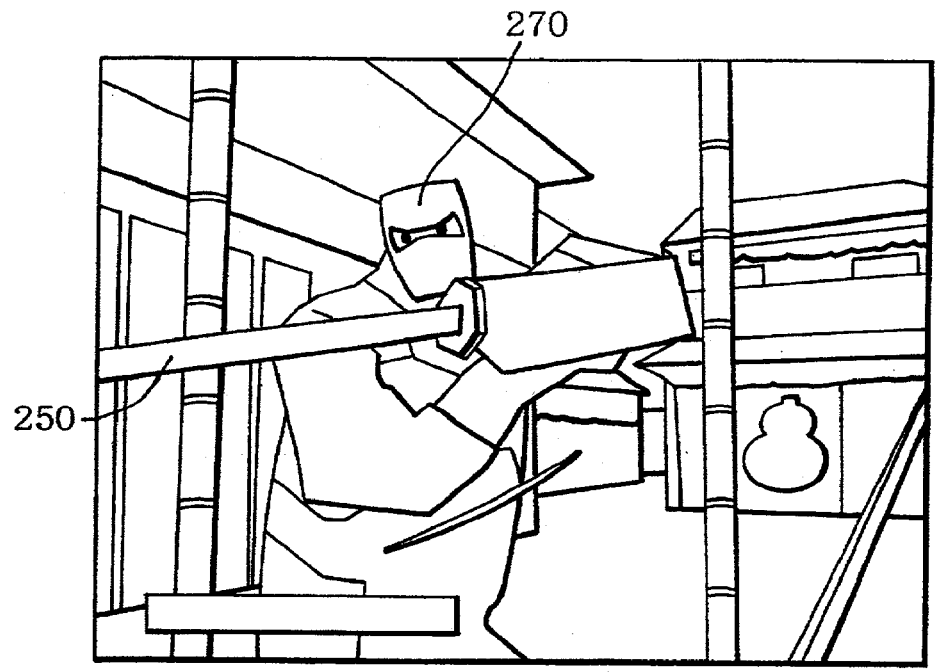
FIGS. 13A and 13B show examples of game images during the repulsion of the attack of the enemy character by the action of the player in accordance with this embodiment.
Figure 13B:
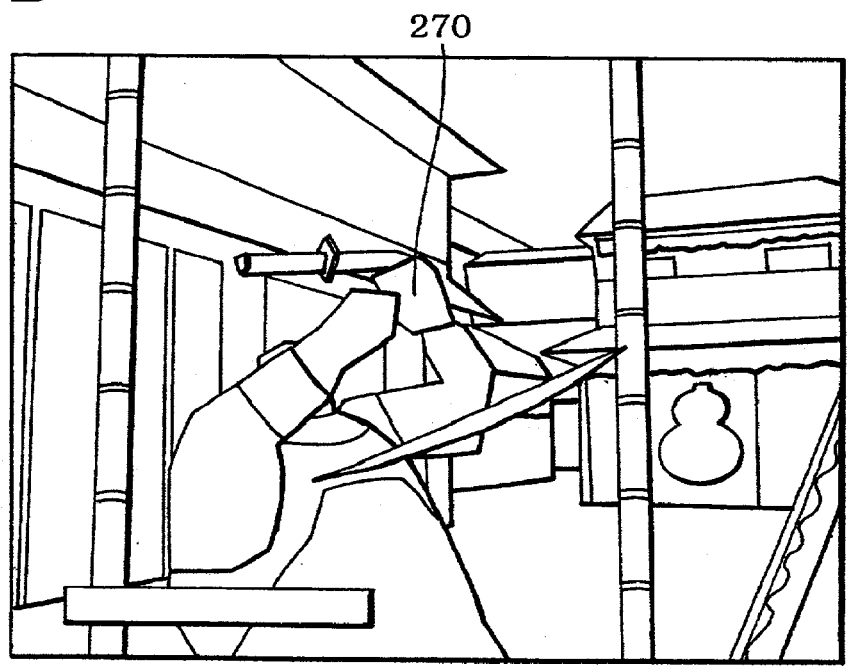

If the inner product of Vp and Ve is negative (Y at step S11), in other words, if it is determined that the player has repulsed the sword object 250 of the enemy character with the sword-shaped controller 40, the character manipulated by the player does not receive the attack of the enemy character (there is no decrease in the life points of the character manipulated by the player) and processing is done to repulse the enemy character (step S13). In other words, if an enemy character 270 shown in FIG. 13A starts an attack against the character manipulated by the player, the above described condition is satisfied, and repulse processing against the enemy character is performed, the system performs processing to cause the display of an image of the enemy character retreating, as shown in FIG. 13B. During this time, the enemy character cannot attack or defend until he has taken up a stance, so it is possible to implement a battle strategy whereby the player can poke through that gap and launch a counterattack against the enemy character.

Note that the player's character takes up a usual defensive stance (step S14) if it is determined at step S10 that dp and de are not (substantially) orthogonal (N at step S10), or if it is determined at step S11 that Vp and Ve are not (substantially) parallel (N at step S11), or if it is determined at step S12 that the inner product of Vp and Ve is not negative (N at step S12). In other words, there is no decrease in the life points of the character manipulated by the player with respect to the attack of the enemy character, or they are decreased by only a portion.

In this manner, the player's attacking stance and defensive stance is switched in accordance with the orientation of the sword-shaped controller 40 with respect to the screen 30.

2.4.4 Special Technique

As described above, the state in which the sword-shaped controller is wielded by the player, as detected by the detection device of FIG. 1, can be obtained as a position on the screen 30, swing speed, orientation, and swing width. It is therefore possible to combine one or more of the above factors to enable an attack on the enemy character by a special technique (killing technique) that is dramatically greater than the attacking power used during a usual attack.

Figure 14A:
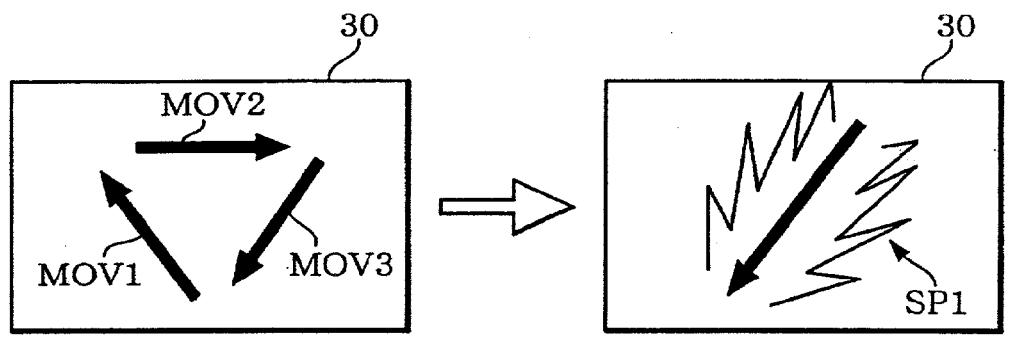
FIGS. 14A and 14B are illustrative views of an example of an action pattern for enabling the player to exhibit a killing technique.
Figure 14B:
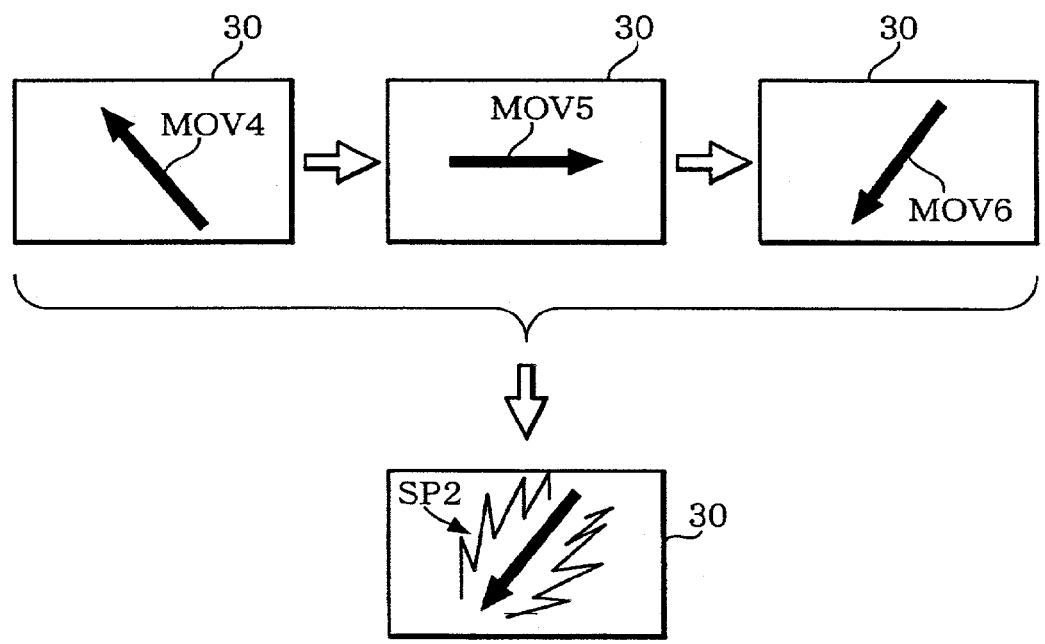

An example of an action pattern for enabling the player to exhibit a killing technique is shown in FIGS. 14A and 14B.

As shown by way of example in FIG. 14A, if the player makes a cutting action after making given fixed movements MOV1 to MOV3 at the position of the sword-shaped controller 40 on the screen 30, a special technique SP1 that is associated with the given fixed movements can be used to enable an attack.

More specifically, a table which is previously loaded with patterns of positions on the screen and related changes, each corresponding to a special technique, is provided beforehand, as shown in FIG. 15. When an action pattern that is determined by a combination or at least one or two of the position, orientation of movement, speed, and swing width of the sword-shaped controller 40 wielded by the player matches an action pattern that is stored in that table, the special technique associated with that action pattern is exhibited.

Alternatively, if the player makes a cutting action after cutting fixed sequences MOV4 to MOV6 at the position of the sword-shaped controller 40 on the screen 30, a special technique SP2 that is associated with the fixed sequences can be used to enable an attack, as shown in FIG. 14B.

In this case too, a table which is previously loaded with patterns of positions on the screen and related changes, each corresponding to a special technique, is provided beforehand, as shown in FIG. 15, with the configuration being such that the special technique associated with that action pattern is exhibited when an action pattern that is determined by a combination or at least one or two of the position, orientation of movement, speed, and swing width of the sword-shaped controller 40 wielded by the player matches an action pattern that is stored in that table.

2.4.5 Others

Since this embodiment makes it possible to obtain the state in which the sword-shaped controller is wielded by the player as a position on the screen 30, speed of the swing, orientation, and swing width, a vulnerable point of the enemy character could be set for the enemy character, by way of example, and the attacking power of the character manipulated by the player could be increased and a large amount of damage given to the enemy character when the position on the screen of the sword-shaped controller wielded by the player changes, on condition that it passes through the position of that vulnerable point.

Alternatively, the player could aim for an eye as a target object of the sword stroke. More specifically, the system could determine the orientation of the track along which the position on the screen of the sword-shaped controller wielded by the player changes, and determine whether that target object has been slashed or not slashed in accordance with that orientation.

In this manner, it is possible to provide game images or game effects that enable an improved feeling of a virtual reality over a wide variety of actions that has not been possible up to now, by obtaining the state in which the sword-shaped controller is wielded by the player as a position on the screen 30, speed of the swing, orientation, and swing width.

3. Example of Processing of this Embodiment

Figure 16:
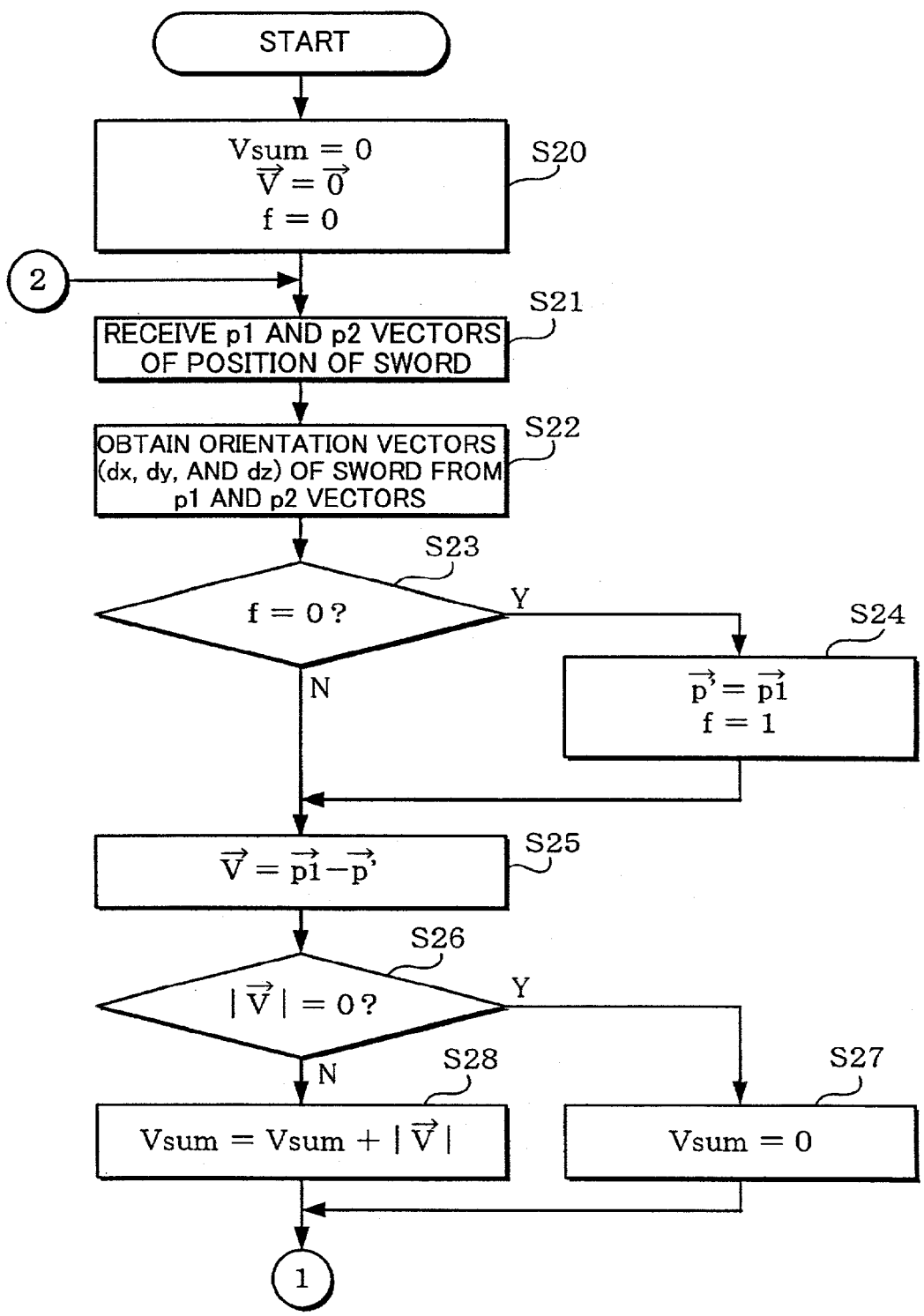
FIG. 16 is a flowchart of the initial part of a detailed example of the processing in accordance with this embodiment.
Figure 17:
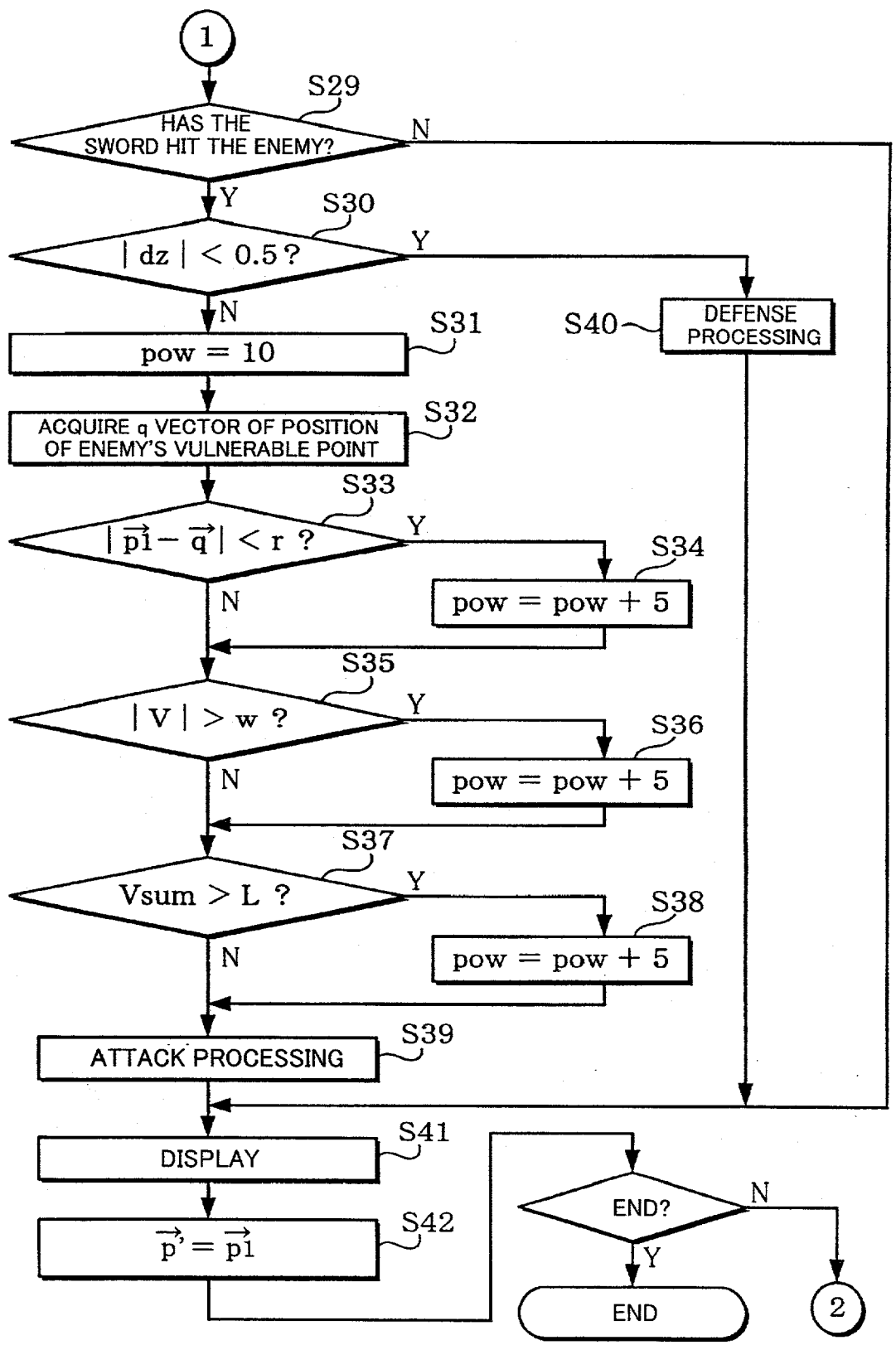
FIG. 17 is a flowchart of the later part of a detailed example of the processing in accordance with this embodiment.

The description now turns to a detailed example of the processing of this embodiment, with reference to FIGS. 16 and 17.

The various terms that are used in this case are defined as follows:

Vsum: length of movement of the sword-shaped controller on the screen (swing width)

Vvector: magnitude of movement of sword-shaped controller per frame (amount of change)

f: initialization determination flag p1 vector: position of the sword-shaped controller detected by the first sensor plane of the detection device of FIG. 1 p2 vector: position of the sword-shaped controller detected by the second sensor plane of the detection device of FIG. 1

(dx, dy, dz): x component, y component, and z component of orientation of sword-shaped controller on the screen (where dz is in the depthwise direction of the screen)

p' vector: position in first sensor plane of detection device of FIG. 1, in previous frame pow: attacking power of sword-shaped controller or attacking power of the character manipulated by the player q vector: position of a vulnerable point of the enemy character r: magnitude of the vulnerable point of the enemy character (constant)

W: threshold of speed of swing of sword-shaped controller (constant)

L: threshold of swing width of sword-shaped controller

First of all, the processing section 100 initializes by setting the swing width (distance of movement on the screen) Vsum of the sword-shaped controller to 0, the V vector of the amount of change per frame of the sword-shaped controller to 0, and the initialization determination flag f to 0 (step S20).

The p1 vector and p2 vector of the position of the sword-shaped controller within the first and second sensor planes of the detection device are then received by the input information reception section 162 (step S21).

The p1 vector and p2 vector received in step S21 are then used in the position calculation section 110 of the processing section 100 to normalize the x component, y component, and z component of the position on the screen to obtain dx, dy, and dz (step S22).

In this case, if the initialization determination flag f is 0 (Y at step S23), the position p1 vector of the sword-shaped controller in the first sensor plane of the detection device of FIG. 1 is set into the position p' vector for the previous frame in the first sensor plane of the detection device, and also the initialization determination flag f is set to 1 (step S24).

After the initialization of step S24, or if the initialization determination flag f is not 0 in step S23 (N at step S23), a vector that is the p1 vector minus the p' vector is substituted into the V vector in the position calculation section 110, to obtain the amount of movement of the sword-shaped controller in one frame, in other words, the speed thereof (step S25).

If the absolute value of the V vector is 0 (Y at step S26), Vsum is set to 0 (step S27).

If the absolute value of the V vector is not 0 (N at step S26), on the other hand, the absolute value of the V vector is added to Vsum, to update the length through which the sword-shaped controller has moved on the screen (step S28).

A hit check is then performed between the sword-shaped controller wielded by the player and the enemy character (step S29). More specifically, the system determines whether or not the position of the enemy character in the drew image after geometry processing of the object image generated by the image generation section 140 lies on the track along which the sword-shaped controller changes position on the screen.

If it is determined that a hit has occurred (Y at step S29) the system determines whether or not the absolute value of the dz component is less than 0.5 (step S30). In other words, if the absolute value of the dz component is less than 0.5, the system judges that the component in the depthwise direction of the screen is small and thus determines that the orientation of the sword-shaped controller with respect to the screen is at rest with respect to the screen. If the absolute value of the dz component is greater than or equal to 0.5, on the other hand, the system judges that the component in the depthwise direction of the screen is large and thus determines that the orientation of the sword-shaped controller with respect to the screen is vertical with respect to the screen.

If it is determined that the absolute value of the dz component is not less than 0.5 (N at step S30), the system sets the attacking power in the parameter setting section 130 to 10 (step S31).

It also acquires the q vector of the position of the vulnerable point of the enemy character (step S32), and determines whether or not the absolute value of the difference between the p1 vector and the q vector is less than the magnitude r of the vulnerable point of the enemy character (step S33).

If the absolute value of the difference between the p1 vector and the q vector is less than r (Y at step S33), 5 is added to the attacking power pow in the parameter setting section 130 to increase the attacking power (step S34).

After 5 has been added to the attacking power pow in step S34, or if it has been determined in step S33 that the absolute value of the difference between the p1 vector and the q vector is not less than (N at step S33), the absolute value of the V vector is then compared with the given threshold W (step S35).

If the absolute value of the V vector is greater than the given threshold W (Y at step S35), 5 is added to the attacking power pow in the parameter setting section 130 to increase the attacking power (step S36).

After adding to the attacking power pow in step S36, or if it has been determined in step S35 that the absolute value of the V vector is not greater than W (N at step S35), the system then compares Vsum with a given threshold L (step S37).

If Vsum is greater than the given threshold L (Y at step S37), 5 is added to the attacking power pow in the parameter setting section 130 to increase the attacking power (step S38)

After 5 has been added to the attacking power pow in step S38, or if it has been determined in step S37 that Vsum is not greater than L (N at step S37), the system performs processing to determine the damage imparted to the enemy character who was hit at that point with the attacking power pow (step S39). This reduces the life points (life force) granted to the enemy character, for example.

If is it determined at step S30 that the absolute value of the dz component is less than 0.5 (Y at step S30), on the other hand, the system performs processing to defend against the enemy's attack (step S40). If the enemy character has attacked, for example, the processing of FIG. 12 is performed, then processing for rebounding against the attack of the enemy character is performed.

If it has been determined in step S29 that the sword does not hit the enemy character (N at step S29), the display is of images of the enemy character, the sword, and the slash mark thereof, or an image after the springing of the attack of the enemy character, as shown in FIG. 11B, after the defense processing of step S40 has been performed or after the attack processing of step S39 has been performed. The display of the sword and its slash mark can be based on data such as the position of the sword-shaped controller as detected by the detection device.

The p1 vector is then substituted into the p' vector in preparation for the next frame (step S42).

In this case, the processing sequence ends if the game ends (N at step S43) or returns to step S21 (N at step S43) if the game does not end (Y at step S43).

As described above, the image generation system in accordance with this embodiment obtains a position on the screen from the position of the manipulation input section in the sensor plane formed by the detection device of FIG. 1, then imparts a given special effect based on that position or a change in position obtained from that position, thus enabling the generation of images in response to a wide variety of operations, which has not been possible up to now.

4. Hardware Configuration

Figure 18:
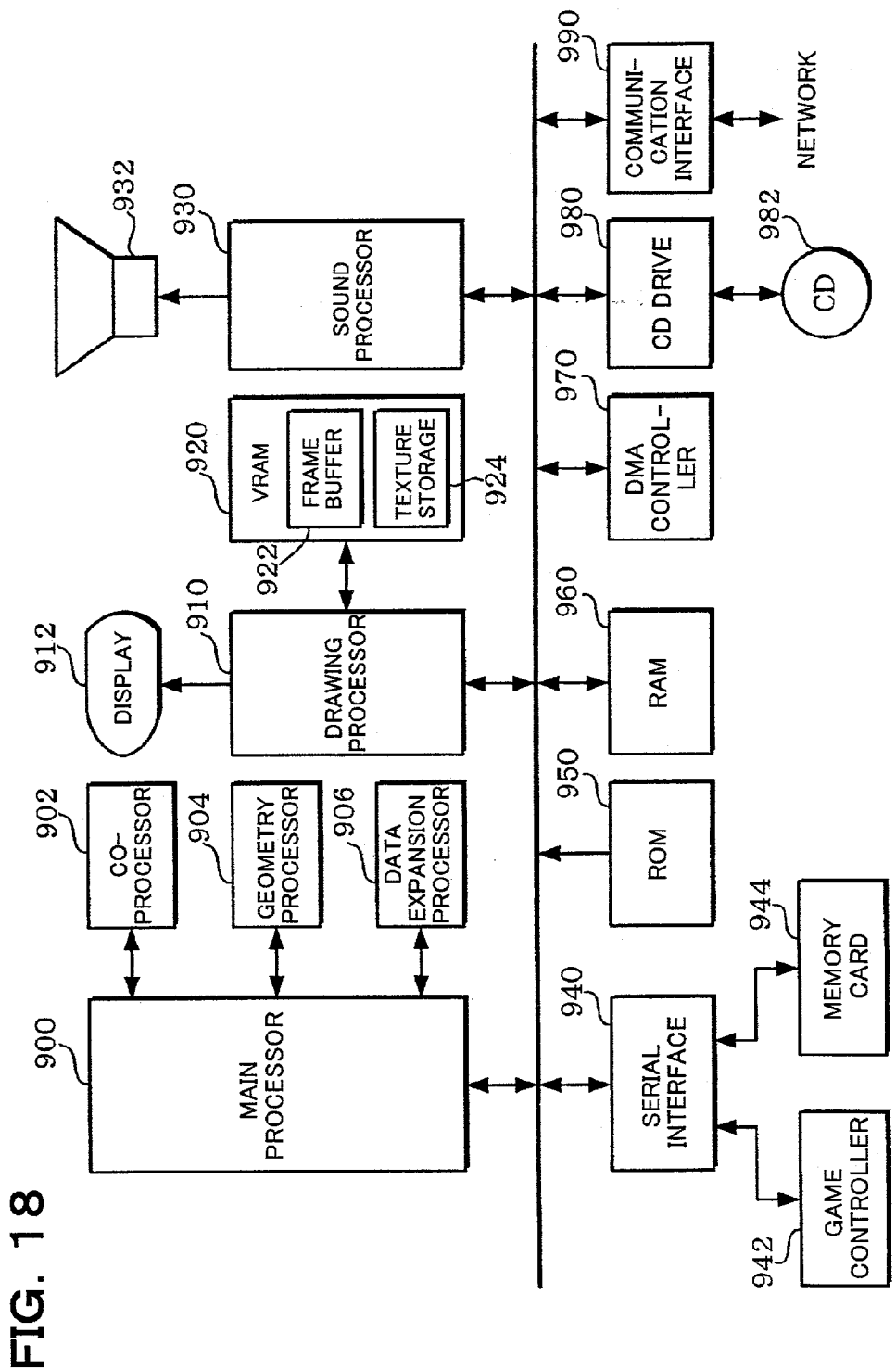
FIG. 18 shows an example of the configuration of hardware that can implement this embodiment.

The description now turns to an example of a hardware configuration that can implement this embodiment of the present invention, with reference to FIG. 18.

A main processor 900 executes various different types of processing such as game processing, image processing, and sound processing, based on a program stored in a CD 982 (an information storage medium), a program transferred through a communication interface 990, or a program stored in a ROM 950 (an information storage medium).

A co-processor 902 is designed to supplement the processing of the main processor 900 and comprises product-summers and dividers that enable high-speed parallel computations, to execute matrix computations (vector computations) at high speed. When matrix computations or the like are necessary in a physical simulation for making an object move and act, by way of example, a program running on the main processor 900 will instruct (request) the co-processor 902 to perform that processing.

A geometry processor 904 is designed to perform geometrical processing such as coordinate conversion, transparency conversion, light-source computation, and curved surface generation and comprises product-summers and dividers that enable high-speed parallel computations, to execute matrix computations (vector computations) at high speed. When processing such as coordinate conversion, transparency conversion, or light-source computation is performed, by way of example, a program running on the main processor 900 will instruct the geometry processor 904 to perform that processing.

A data expansion processor 906 expands and decodes compressed image and sound data, and performs processing to accelerate the decoding of the main processor 900. This ensures that moving images that have been compressed by the MPEG method or the like can be displayed during an opening screen, intermission screen, ending screen, or game screens. Note that the image and sound data to be decoded is stored in the ROM 950 or the CD 982, or it is transferred from the exterior through the communication interface 990.

A drawing processor 910 is designed to draw (rendering) an object made up of primitive surfaces such as polygons or curved surfaces, at high speed. During the drawing of the object, the main processor 900 utilizes the functions of a DMA controller 970 to pass object data to the drawing processor 910 and also transfer textures in a texture storage section 924, if necessary. When that happens, the drawing processor 910 draws the object into a frame buffer 922 at high speed, based on this object data and textures, while utilizing a Z buffer or the like to erase hidden surfaces. The drawing processor 910 can also perform processing such as α blending (semi-transparency processing), depth cueing, mip mapping, fog processing, bilinear filtering, trilinear filtering, anti-aliasing, and shading. When images for one frame are written to the frame buffer 922, those images are displayed on a display 912.

A sound processor 930 incorporates a multi-channel ADPCM audio source or the like and generates high-quality game sounds such as background music, sound effects, and voices. The thus-created game sounds are output from a speaker 932.

Manipulation data from a game controller 942 (such as a joystick, buttons, casing, or a bat-shaped or handgun-shaped controller) and save data and personal data from a memory card 944 are transferred through a serial interface 940.

A system program or the like is stored in the ROM 950. Note that if the system is an arcade game system, the ROM 950 would function as an information storage medium and various different programs would be stored in the ROM 950. Note also that a hard disk could be utilized instead of the ROM 950.

A RAM 960 is used as a work area for the various processors.

The DMA controller 970 controls DMA transfer between the processors and memory (such as RAM, VRAM, or ROM).

A CD drive 980 drives the CD 982 (information storage medium) which contains data such as a program, image data, and sound data, enabling access to that program and data.

The communication interface 990 provides an interface for data transfer to and from external devices over a network. In this case, a communication network (analog telephone line or ISDN) or high-speed serial interface bus could be considered as the network connected to the communication interface 990. The use of a communication network would make it possible to transfer data via the Internet. The use of a high-speed serial interface bus would also make it possible to transfer data to and from other devices such as another image generation system.

Alternatively, it is possible to consider the reception of input information for specifying details such as the position of the manipulation input section in the sensor plane within a detection device (not shown in the figure), through the communication interface 990.

Note that the various processes of the present invention could all be implemented by hardware alone or they could be implemented by a program stored in an information storage medium or a program distributed through a communication interface. Alternatively, they could be implemented by both hardware and programming.

If the various processes of the present invention are implemented by both hardware and a program, a program (program and data) for implementing the processes of the present invention in hardware is stored in the information storage medium. More specifically, this program instructs the processors 902, 904, 906, 910, and 930, which are hardware, and also transfers data if necessary. The processors 902, 904, 906, 910, and 930 implement the various processes in accordance with the present invention, based on these instructions and the transferred data.

Note that the present invention is not limited to the embodiment described above, and thus various modifications thereto are possible.

For example, the detection mechanism is not limited to the detection methods described with reference to FIGS. 1, 3A, 3B, 5A, and 5B. The detection device could be such that the position of the manipulation input section is detected by ultrasonic waves instead of infrared light, or the position of the manipulation input section could be detected by using the principles of image identification or motion capture. In other words, the detection device could be made capable of detecting the position of a part of the body of the player or the manipulation input section wielded by the player, or information for specifying such a position.

This embodiment has been described with reference to an example in which a sword-shaped controller is used as the manipulation input section, but the present invention is not limited thereto and is even not limited to other weapons such as spears or clubs, so it is thus possible to conceive of applications to a command staff or golf club, or even to a kitchen knife used in cooking.

It is possible for an aspect of the present invention that is defined by a dependent claim to omit some of the configurational requirements of the corresponding antecedent claim. Similarly, the components of the present invention defined by an independent claim can also be allocated to other independent claims.

The present invention can be applied to various games (such as hand-to-hand combat games, shooting games, robot-battling games, sports games, competitive games, role-playing games, instrument-playing games, and dance games).

This invention is can be applied to various image generation systems (game systems) such as arcade game systems, domestic game systems, large-scale attractions in which many players can participate, simulators, multimedia terminals, and system boards that create game images.

What is claimed is:

1. An image generation method for generating an image, the method comprising:

obtaining at least one of a position on a screen of a display section and a change of the position on the screen, based on input information from a detection device which detects an object to be detected traversing two sensor planes, each position of the sensor plane corresponding to the position on the screen, a predetermined distance being disposed between the two sensor planes; and changing at least one of an image, a sound, and a given parameter, based on the obtained position on the screen or change of the position on the screen, wherein the two sensor planes are parallel and disposed to face the screen.

2. The image generation method as defined by claim 1, wherein at least one of the image, sound, and given parameter is changed in accordance with a changing direction of the position on the screen.

3. An image generation method for generating an image, the method comprising:

obtaining at least one of a position on a screen of a display section and an amount of change per unit time of the position on the screen, based on input information from a detection device which detects an object to be detected traversing two sensor planes, each position of the sensor plane corresponding to the position on the screen, a predetermined distance being disposed between the two sensor planes; and changing at least one of an image, a sound, and a given parameter, based on the obtained position on the screen or amount of change per unit time of the position on the screen, wherein the two sensor planes are parallel and disposed to face the screen.

4. The image generation method as defined by claim 3, wherein at least one of the image, sound, and given parameter is changed, when the amount of change per unit time of the position on the screen is at least a given threshold.

5. The image generation method as defined by claim 3, wherein at least one of the image, sound, and given parameter is changed in accordance with a changing direction of the position on the screen.

6. An image generation method for generating an image, the method comprising:

obtaining at least one of a position on a screen of a display section, an amount of change per unit time of the position on the screen, and an absolute value of the amount of change in the position on the screen, based on input information from a detection device which detects an object to be detected traversing two sensor planes, a predetermined distance being disposed between the two sensor planes, each position of the sensor plane corresponding to the position on the screen; and changing at least one of an image, a sound, and a given parameter, based on the obtained position on the screen, amount of change per unit time of the position on the screen, and absolute value of the amount of change in the position on the screen, wherein the two sensor planes are parallel and disposed to face the screen.

7. The image generation method as defined by claim 6, wherein at least one of the image, sound, and given parameter is changed, when the amount of change per unit time of the position on the screen is at least a given threshold.

8. The image generation method as defined by claim 6, wherein at least one of the image, sound, and given parameter is changed, when the absolute value of the amount of change of the position on the screen is at least a given threshold.

9. The image generation method as defined by claim 6, wherein at least one of the image, sound, and given parameter is changed in accordance with a changing direction of the position on the screen.

10. An image generation method for generating an image, the method comprising:

obtaining at least one of a position on a screen of a display section, an amount of change per unit time of the position on the screen, an absolute value of the amount of change in the position on the screen, and an orientation of an object to be detected with respect to a direction toward a screen, based on input information from a detection device which detects an object to be detected traversing two sensor planes, each position of the sensor plane corresponding to the position on the screen, a predetermined distance being disposed between the two sensor planes; and changing at least one of an image, a sound, and a given parameter, based on the obtained position on the screen, amount of change per unit time of the position on the screen, absolute value of the amount of change in the position on the screen, and orientation of the object to be detected with respect to the direction toward the screen, wherein the two sensor planes are parallel and disposed to face the screen.

11. The image generation method as defined by claim 10, wherein at least one of the image, sound, and given parameter is changed, when the amount of change per unit time of the position on the screen is at least a given threshold.

12. The image generation method as defined by claim 10, wherein at least one of the image, sound, and given parameter is changed, when the absolute value of the amount of change of the position on the screen is at least a given threshold.

13. The image generation method as defined by claim 10, wherein the detection device comprises two pairs of sensors which form first and second sensor planes, respectively, the first and second sensor planes being disposed parallely with the predetermined distance, wherein positions at which the object to be detected traverses the first and second sensor planes are specified by the detection device, and wherein the orientation of the object to be detected with respect to the direction towards the screen is obtained based on first and second positions at which the object to be detected traverses the first and second sensor planes, respectively.

14. The image generation method as defined by claim 10, wherein at least one of the image, sound, and given parameter is changed in accordance with a given combination of the position on the screen, the absolute value of the amount of change in the position on the screen, and a changing direction of the position on the screen.

15. The image generation method as defined by claim 10, wherein at least one of the image, sound, and given parameter is changed in accordance with a changing direction of the position on the screen.

16. A program stored in a computer-readable information storage medium, the program causing a computer to implement processings of:

obtaining at least one of a position on a screen of a display section and a change of the position on the screen, based on input information from a detection device which detects an object to be detected traversing two sensor planes, each position of the sensor plane corresponding to the position on the screen, a predetermined distance being disposed between the two sensor planes; and changing at least one of an image, a sound, and a given parameter, based on the obtained position on the screen or change of the position on the screen, wherein the two sensor planes are parallel and disposed to face the screen.

17. The program as defined by claim 16, wherein at least one of the image, sound, and given parameter is changed in accordance with a changing direction of the position on the screen.

18. A computer-readable information storage medium storing a program as defined by claim 16.

19. A program stored in a computer-readable information storage medium, the program causing a computer to implement processings of:

obtaining at least one of a position on a screen of a display section and an amount of change per unit time of the position on the screen, based on input information from a detection device which detects an object to be detected traversing two sensor planes, each position of the sensor plane corresponding to the position on the screen, a predetermined distance being disposed between the two sensor planes; and changing at least one of an image, a sound, and a given parameter, based on the obtained position on the screen or amount of change per unit time of the position on the screen, wherein the two sensor planes are parallel and disposed to face the screen.

20. The program as defined by claim 19, wherein at least one of the image, sound, and given parameter is changed, when the amount of change per unit time of the position on the screen is at least a given threshold.

21. The program as defined by claim 19, wherein at least one of the image, sound, and given parameter is changed in accordance with a changing direction of the position on the screen.

22. A computer-readable information storage medium storing a program as defined by claim 19.

23. A program stored in a computer-readable information storage medium, the program causing a computer to implement processings of:

obtaining at least one of a position on a screen of a display section, an amount of change per unit time of the position on the screen, and an absolute value of the amount of change in the position on the screen, based on input information from a detection device which detects an object to be detected traversing two sensor planes, each position of the sensor plane corresponding to the position on the screen, a predetermined distance being disposed between the two sensor planes; and changing at least one of an image, a sound, and a given parameter, based on the obtained position on the screen, amount of change per unit time of the position on the screen, and absolute value of the amount of change in the position on the screen, wherein the two sensor planes are parallel and disposed to face the screen.

24. The program as defined by claim 23, wherein at least one of the image, sound, and given parameter is changed, when the amount of change per unit time of the position on the screen is at least a given threshold.

25. A program stored in a computer-readable information storage medium, the program causing a computer to implement processings of:

obtaining at least one of a position on a screen of a display section, an amount of change per unit time of the position on the screen, an absolute value of the amount of change in the position on the screen, and an orientation of an object to be detected with respect to a direction toward a screen, based on input information from a detection device which detects an object to be detected traversing two sensor planes, each position of the sensor plane corresponding to the position on the screen, a predetermined distance being disposed between the two sensor planes; and changing at least one of an image, a sound, and a given parameter, based on the obtained position on the screen, amount of change per unit time of the position on the screen, absolute value of the amount of change in the position on the screen, and orientation of the object to be detected with respect to the direction toward the screen, wherein the two sensor planes are parallel and disposed to face the screen.

26. The program as defined by claim 23, wherein at least one of the image, sound, and given parameter is changed, when the absolute value of the amount of change of the position on the screen is at least a given threshold.

27. The program as defined by claim 23, wherein at least one of the image, sound, and given parameter is changed in accordance with a changing direction of the position on the screen.

28. A computer-readable information storage medium storing a program as defined by claim 23.

29. The program as defined by claim 25,
wherein at least one of the image, sound, and given parameter is changed, when the amount of change per unit time of the position on the screen is at least a given threshold.

30. The program as defined by claim 25,
wherein at least one of the image, sound, and given parameter is changed, when the absolute value of the amount of change of the position on the screen is at least a given threshold.

31. The program as defined by claim 25,
wherein the detection device comprises two pairs of sensors which form first and second sensor planes, respectively, the first and second sensor planes being disposed parallely with the predetermined distance,
wherein positions at which the object to be detected traverses the first and second sensor planes are specified by the detection device, and
wherein the orientation of the object to be detected with respect to the direction towards the screen is obtained based on first and second positions at which the object to be detected traverses the first and second sensor planes, respectively.

32. The program as defined by claim 25,
wherein at least one of the image, sound, and given parameter is changed in accordance with a given combination of the position on the screen, the absolute value of the amount of change in the position on the screen, and a changing direction of the position on the screen.

33. The program as defined by claim 25,
wherein at least one of the image, sound, and given parameter is changed in accordance with a changing direction of the position on the screen.

34. A computer-readable information storage medium storing a program as defined by claim 25.

35. An image generation method for generating an image, the method comprising:
obtaining at least one of a position on a screen of a display section and a change of the position on the screen, based on input information from a detection device which detects an object to be detected traversing two parallel sensor planes, each position of the respective sensor plane corresponding to the respective position on the screen; and
changing at least one of an image, a sound, and a given par the obtained position on the screen or change of the position on the screen.

36. An image generation method for generating an image, the method comprising:
obtaining at least one of a position on a screen of a display section and an amount of change per unit time of the position on the screen, based on input information from a detection device which detects an object to be detected traversing two parallel sensor planes, each position of the respective sensor plane corresponding to the respective position on the screen; and
changing at least one of an image, a sound, and a given parameter, based on the obtained position on the screen or amount of change per unit time of the position on the screen.

37. An image generation method for generating an image, the method comprising:
obtaining at least one of a position on a screen of a display section, an amount of change per unit time of the position on the screen, and an absolute value of the amount of change in the position on the screen, based on input information from a detection device which detects an object to be detected traversing two parallel sensor planes, each position of the respective sensor plane corresponding to the respective position on the screen; and
changing at least one of an image, a sound, and a given par the obtained position on the screen, amount of change per unit time of the position on the screen, and absolute value of the amount of change in the position on the screen.

38. An image generation method for generating an image, the method comprising:
obtaining at least one of a position on a screen of a display section, an amount of change per unit time of the position on the screen, an absolute value of the amount of change in the position on the screen, and an orientation of an object to be detected with respect to a direction toward a screen, based on input information from a detection device which detects an object to be detected traversing two parallel sensor planes, each position of the respective sensor plane corresponding to the respective position on the screen; and
changing at least one of an image, a sound, and a given par the obtained position on the screen, amount of change per unit time of the position on the screen, absolute value of the amount of change in the position on the screen, and orientation of the object to be detected with respect to the direction toward the screen.

39. A program stored in a computer-readable information storage medium, the program causing a computer to implement processing of:
obtaining at least one of a position on a screen of a display section and a change of the position on the screen, based on input information from a detection device which detects an object to be detected traversing two parallel sensor planes, each position of the respective sensor plane corresponding to the respective position on the screen; and
changing at least one of an image, a sound, and a given par the obtained position on the screen or change of the position on the screen.

40. A computer-readable information storage medium storing a program as defined by claim 39.

41. A program stored in a computer-readable information storage medium, the program causing a computer to implement processing of:
obtaining at least one of a position on a screen of a display section and an amount of change per unit time of the position on the screen, based on input information from a detection device which detects an object to be detected traversing two parallel sensor planes, each position of the respective sensor plane corresponding to the respective position on the screen; and
changing at least one of an image, a sound, and a given parameter, based on the obtained position on the screen or amount of change per unit time of the position on the screen.

42. A computer-readable information storage medium storing a program as defined by claim 41.

43. A program stored in a computer-readable information storage medium, the program causing a computer to implement processing of:
obtaining at least one of a position on a screen of a display section, an amount of change per unit time of the position on the screen, and an absolute value of the amount of change in the position on the screen, based on input information from a detection device which detects an object to be detected traversing two parallel sensor planes, each position of the respective sensor plane corresponding to the respective position on the screen; and changing at least one of an image, a sound, and a given par the obtained position on the screen, amount of change per unit time of the position on the screen, and absolute value of the amount of change in the position on the screen.

44. A computer-readable information storage medium storing a program, as defined by claim 43.

45. A program stored in a computer-readable information storage medium, the program causing a computer to implement processing of:

obtaining at least one of a position on a screen of a display section, an amount of change per unit time of the position on the screen, an absolute value of the amount of change in the position on the screen, and an orientation of an object to be detected with respect to a direction toward a screen, based on input information from a detection device which detects an object to be detected traversing two parallel sensor planes, each position of the respective sensor plane corresponding to the respective position on the screen; and changing at least one of an image, a sound, and a given parameter, based on the obtained position on the screen, amount of change per unit time of the position on the screen, absolute value of the amount of change in the position on the screen, and orientation of the object to be detected with respect to the direction toward the screen.

46. A computer-readable information storage medium storing a program as defined by claim 45.

* * * * *